(12) United States Patent
Massad

(10) Patent No.: US 11,074,046 B2
(45) Date of Patent: Jul. 27, 2021

(54) METHODS AND SYSTEMS FOR GENERATING CODE TO ENABLE A HONEST/FLEXIBLE FUNCTIONAL DEPENDENCY INJECTION APPROACH

(71) Applicants: Yacoub Elias Yacoub Massad, Beit Sahour (PS); Issam Hanna Andoni, Oakton, VA (US)

(72) Inventor: Yacoub Elias Yacoub Massad, Beit Sahour (PS)

( * ) Notice: Subject to any disclaimer, the term of this patent is extended or adjusted under 35 U.S.C. 154(b) by 0 days.

(21) Appl. No.: 16/941,424

(22) Filed: Jul. 28, 2020

(65) Prior Publication Data

US 2021/0034334 A1  Feb. 4, 2021

Related U.S. Application Data

(60) Provisional application No. 62/880,534, filed on Jul. 30, 2019.

(51) Int. Cl.
| | | |
|---|---|---|
| *G06F 9/44* | (2018.01) | |
| *G06F 8/30* | (2018.01) | |
| *G06F 8/41* | (2018.01) | |

(52) U.S. Cl.
CPC . *G06F 8/31* (2013.01); *G06F 8/41* (2013.01)

(58) Field of Classification Search
CPC ..................................... G06F 8/31; G06F 8/41
USPC .................................................. 717/106–119
See application file for complete search history.

(56) References Cited

U.S. PATENT DOCUMENTS

| | | | | |
|---|---|---|---|---|
| 8,607,203 | B1* | 12/2013 | Mehra .................. | G06F 11/3688 717/131 |
| 8,745,584 | B2* | 6/2014 | Huang ...................... | G06F 8/71 717/121 |
| 8,856,734 | B2* | 10/2014 | Thyagarajan ............. | G06F 8/61 717/107 |
| 9,535,726 | B2* | 1/2017 | Lagerblad ........... | G06F 9/44526 |
| 9,678,720 | B2* | 6/2017 | Hale ......................... | G06F 8/74 |
| 2013/0067445 | A1 | 3/2013 | Gounares et al. | |
| 2013/0073523 | A1 | 3/2013 | Gounares et al. | |

(Continued)

OTHER PUBLICATIONS

Prasanna, "Dependency Injection—Design Patterns Using Spring and Guide", 2009, Manning Publications, 336 pages. (Year: 2009).*

(Continued)

*Primary Examiner* — Ted T. Vo

(57) ABSTRACT

Disclosed herein a method for generating code to enable a honest/flexible functional dependency injection approach. The method may include receiving, using a communication device, a composition code from a user device. The composition code contains a usage of a composition operator. The composition operator is associated with at least two functions. A first function of the at least two functions includes a dependency parameter. The method may include analyzing, using a processing device, the composition code. The method may include generating, using the processing device, a new code based on the analyzing. The new code enables the composition operator for injecting the second function or the output of the second function as a value for the dependency parameter in the first function. The injecting provides a resulting function. The method may include a step of transmitting, using the communication device, the new code to the user device.

39 Claims, 12 Drawing Sheets

(56) References Cited

U.S. PATENT DOCUMENTS

| | | |
|---|---|---|
| 2013/0074056 A1 | 3/2013 | Gounares et al. |
| 2014/0372996 A1 | 12/2014 | Ardoint et al. |
| 2017/0090876 A1* | 3/2017 | Hale .................. G06F 16/2246 |
| 2018/0113686 A1* | 4/2018 | Li ........................ G06F 8/427 |
| 2018/0342324 A1* | 11/2018 | Cha ........................ G16H 70/40 |
| 2019/0146902 A1* | 5/2019 | Jiang .................. G06F 11/3684 |
| | | 717/129 |
| 2019/0377560 A1* | 12/2019 | Papageorgiou ..... G06F 9/44505 |
| 2020/0012590 A1* | 1/2020 | Jiang .................. G06F 11/3688 |

OTHER PUBLICATIONS

Jezek et al., "Dependency Injection Refined by Extra-functional Properties", 2012, IEEE, pp. 255-256. (Year: 2012).*

Andrew Dinn, "Flexible, Dynamic Injection of Structured Advice using Byteman", 2011, ACM, pp. 41-50. (Year: 2011).*

* cited by examiner

```
0 references
class Program
{
    0 references
    static void Main(string[] args)
    {
        X(string#address, int#x => intvar addOneAndLogToServer =
            Module.AddOneAndLog()[R]
            .HonestlyInject(log: Module1.LogToServer()[R])[H];
    }
}

4 references
public static class ModuleFunctions
{
    1 reference
    public static int AddOneAndLog(Action<string> log[P], int x[P])[D]
    {
        log(obj: "Adding one to " + x);
        return x + 1;
    }

1 reference
    public static void LogToServer(string message[P], int x[P])[D]
    {
        Console.WriteLine(value: "Logging to server " + address + Environment.NewLine + Message);
    }
}
```

FIG. 12

METHODS AND SYSTEMS FOR GENERATING CODE TO ENABLE A HONEST/FLEXIBLE FUNCTIONAL DEPENDENCY INJECTION APPROACH

The current application claims a priority to the U.S. provisional patent application Ser. No. 62/880,534 filed on Jul. 30, 2019.

FIELD OF THE INVENTION

Generally, the present disclosure relates to the field of data processing. More specifically, the present disclosure relates to methods and systems for generating code to enable a honest/flexible functional dependency injection approach.

BACKGROUND OF THE INVENTION

Existing techniques for generating code for software and function composition and manipulation are deficient with regard to several aspects. For instance, current technologies do not allow the delaying of the injection of impure dependencies to the last possible moment. Furthermore, current technologies do not allow the easy and flexible passing of inputs from higher-level functions to lower-level functions. Moreover, current technologies do not allow the easy and flexible passing of outputs from lower-level functions to higher-level functions.

Therefore, there is a need for improved methods and systems for generating code to enable a honest/flexible functional dependency injection approach and function composition and manipulation that may overcome one or more of the above-mentioned problems and/or limitations.

BRIEF SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein a method for generating code to enable a honest/flexible functional dependency injection approach. Further, the method may include a step of receiving, using a communication device, a composition code from a user device. Further, the composition code contains a usage of a composition operator. Further, the composition operator may be associated with at least two functions. Further, a first function of the at least two functions may include a dependency parameter. Further, the dependency parameter may include a function parameter or a non-function parameter. Further, the dependency parameter may be selected implicitly or explicitly in the composition code. Further, a second function of the at least two functions provides a value for the dependency parameter. Further, the second function may not be used as a direct value for the dependency parameter. Further, the method may include a step of analyzing, using a processing device, the composition code. Further, the method may include a step of generating, using the processing device, a new code based on the analyzing. Further, the new code enables the composition operator for injecting the second function or the output of the second function as a value for the dependency parameter in the first function. Further, the injecting provides a resulting function. Further, the method may include a step of transmitting, using the communication device, the new code to the user device.

Further, disclosed herein is a system for generating code to enable a honest/flexible functional dependency injection approach. Further, the system may include a communication device and a processing device. Further, the communication device may be configured for receiving a composition code from a user device. Further, the composition code contains a usage of a composition operator. Further, the composition operator may be associated with at least two functions. Further, a first function of the at least two functions may include a dependency parameter. Further, the dependency parameter may include a function parameter or a non-function parameter. Further, the dependency parameter may be selected implicitly or explicitly in the composition code. Further, a second function of the at least two functions provides a value for the dependency parameter. Further, the second function may not be used as a direct value for the dependency parameter. Further, the communication device may be configured for transmitting a new code to the user device. Further, the processing device may be configured for analyzing the composition code. Further, the processing device may be configured for generating the new code based on the analyzing. Further, the new code enables the composition operator for injecting the second function or the output of the second function as a value for the dependency parameter in the first function. Further, the injecting provides a resulting function.

Further, disclosed herein is a non-transitory computer-readable medium comprising computer-executable instructions which when executed on a processing device performs a method for generating code to enable a honest/flexible functional dependency injection approach. Further, the method may include receiving, using the processing device, a composition code. Further, the composition code contains a usage of a composition operator. Further, the composition operator may be associated with at least two functions. Further, a first function of the at least two functions may include a dependency parameter. Further, the dependency parameter may include a function parameter or a non-function parameter. Further, the dependency parameter may be selected implicitly or explicitly in the composition code. Further, a second function of the at least two functions provides a value for the dependency parameter. Further, the second function may not be used as a direct value for the dependency parameter. Further, the method may include analyzing, using the processing device, the composition code. Further, the method may include generating, using the processing device, a new code based on the analyzing. Further, the new code enables the composition operator for injecting the second function or the output of the second function as a value for the dependency parameter in the first function. Further, the injecting provides a resulting function. Further, the method may include storing, using a storage device, the new code.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 12 is a screenshot of a programming code written with the help of a Visual Studio 2017® extension, in accordance with some embodiments.

DETAILED DESCRIPTION OF THE INVENTION

Figure 1:
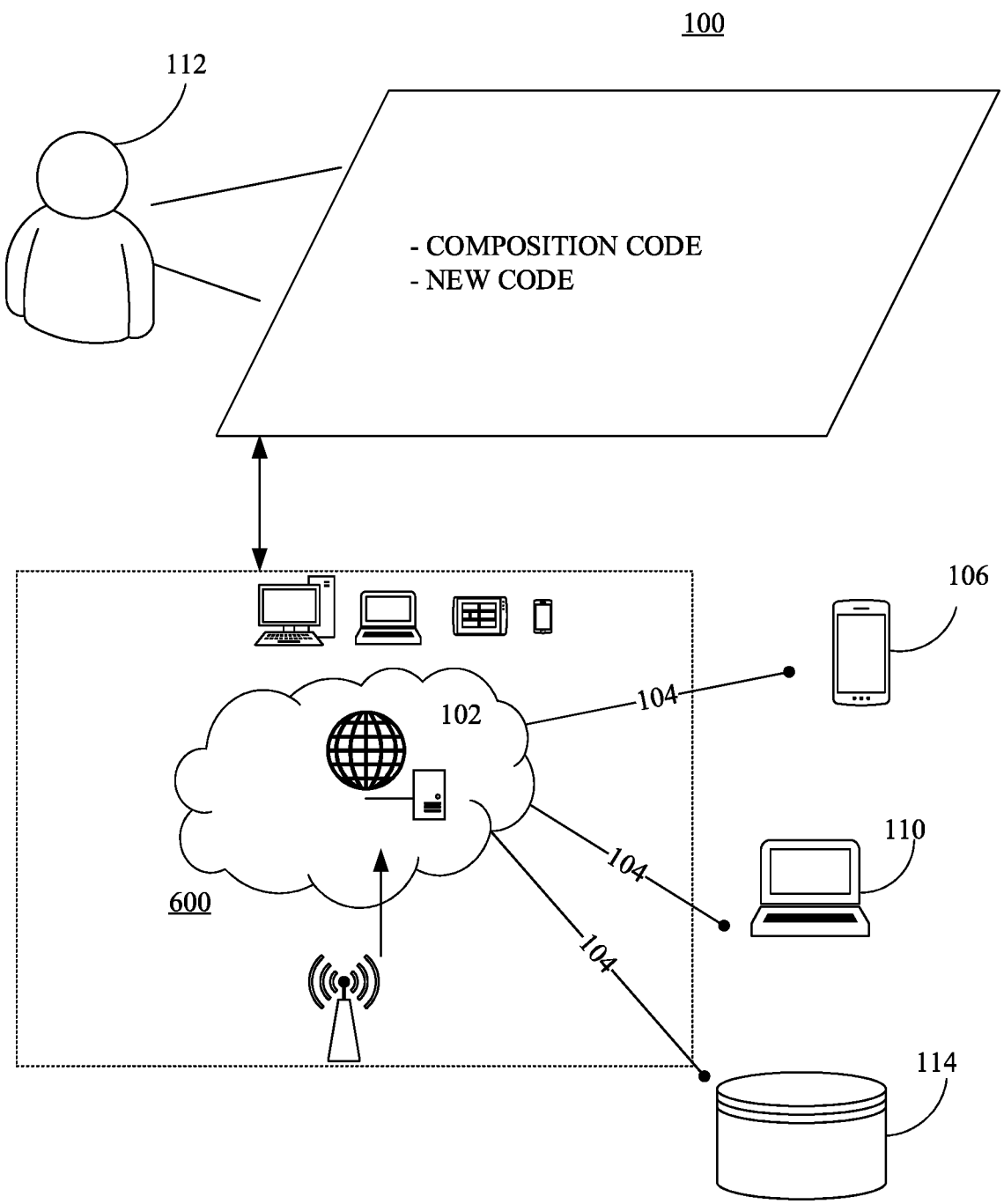
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems and methods for generating code to enable a honest/flexible functional dependency injection approach, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, a GLONASS-K2 receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods and systems for generating code to enable a honest/flexible functional dependency injection approach. Further, the code may be associated with an honest method. Further, the honest method may be one that a user is likely to understand by looking at the signature alone without reading a body of the honest method. A Pure method is a method whose output depends solely on the input arguments of the pure method and does not have any side effects. Further, a pure method does not mutate a parameter, does not read or mutate global state, does not read the system timer, does not read or write file contents, does not read from or write to the console, and so on. Further, an impure method may be converted to a pure or a potentially-pure method to become honest. A potentially-pure method is a method whose body is pure but may invoke functions passed to the potentially-pure method as parameters that may be pure or impure. The function parameters types may be delegates or interfaces or any type of programming abstraction that enables polymorphism. For example, in C#, the Action and Func delegate types may be used as the types of function parameters.

Note: The word "method" is used in many places below to mean a "function".

Note: "function parameter" may mean two different things. It may simply mean a parameter. Or it may mean a parameter whose type is a function. It is easy for a person who is ordinarily skilled in the relevant art to understand the meaning based on the context.

Impure methods may be converted to potentially pure methods. For example, a C# method that invokes Console.WriteLine directly may be changed to invoke a delegate of type Action<string> passed to the method as a parameter.

Further, the present disclosure describes a Flexible functional dependency injection approach in computer programming.

Further, the present disclosure describes programming language/tools design. Programing language developers (people who maintain (create and update) programming languages) and programming tools developers (people who maintain (create and update) tools to help software developers do the jobs) may use the language/tool design to enhance the languages and tools that the programming language and tool developers may maintain.

Further, the present disclosure describes the injection of pure/potentially-pure functions into each other without the need to inject impure dependencies first. This technique may delay the injection of impure dependencies to the last possible moment.

Further, the present disclosure describes the enabling of the lower-level functions to access parameters of higher-order functions. For example, assume that Function1 calls Function2 which calls Function3 which calls Function 4, etc. which calls Function20. Assume that Function2 has a parameter say param1 which is not relevant to Function 3 and therefore is not passed to Function3. Now, if Function20 requires access to this parameter, then Function2 must pass this parameter to Function3 which in turn should pass it to Function4 which should pass it to Function5, etc. until it reaches Function19 and then Function20. If dependency injection is used in the way this disclosure specifies, then Function20 may specify that it requires the parameter (param1) by having it as a parameter in its definition, and then all the upward functions will have this extra parameter once they are composed together as described in this disclosure. Now, the composed version of Function2 will have two copies of the parameters (one defined originally by Function2, and the second is propagated automatically by the invented language/tool feature because it is defined in Function20). Then, it becomes easy (via another language or tool feature) to merge these two parameters into a single parameter.

Further, the present disclosure describes enabling the propagation of some new output of low-level functions to high-level functions. Using the same example above, say that Function20 wants to generate some new output. Without the present disclosure, if the new output is to be propagated to Function2, all intermediate functions should propagate the output manually. E.g. Function19 should take the output from Function20 and give it to Function18, then Function18 should give it to Function17, etc. Using the present disclosure, Function20 may have an indirect output (that is an output in the form of a function parameter). For example, in C# this will be a parameter of type Action<SomeOutput>. This parameter may be propagated to the high-level function, i.e., Function2. Additional language features may easily allow the conversion of output from direct to indirect and vice versa.

Further, the present disclosure describes a certain new feature of programming languages/tools that ultimately helps software developers that use these languages/tools in writing/maintaining software programs.

Further, code may refer to code in any programming language or program. Further, the programming language may include high-level programming languages such as C#. Further, the code may include machine code. Further, the code may be present on a disk or in memory.

Further, a function may include a piece of code that does something and may also return something. Examples include methods in C# and functions in F#. Other examples are anonymous methods and lambda expressions in C#. Further, a composition operator may be an operator that acts on one or more functions and results in new functions (usually one function). This definition does not limit the way in which functions may be composed together. An example is the F# composition operator (>>). Another example is the HonestlyInject method (or operator) introduced in the patent application. This definition does limit how an operator is implemented. In some programming languages, for example, there are special keywords or symbols for some operators, while other operators may be implemented as functions (i.e., a function may be defined to take functions as inputs and return one or more functions as output). Further, the Honest dependency injection operator may include a HonestlyInject operator, and a HonestlyReplace operator. A JoinInputs operator, an AggregateIndirectOutput operator, a HonestlyInjectOne operator, a HonestlyInjectLast operator, and a RenameParameter operator are additional operators that can be used in the composition code to make it easier to work with function composition. Further, the composition code may include a piece of code that uses at least one composition operator to act on at least one function. Examples are:

1. In F# where add1 and times2 are functions
let add1Times2=add1>>times2
2. var resultingFunction=function1.HonestlyInject(read: readFunction);

Code: the term code may refer to code in any programming language or program. This includes high-level programming languages such as C#. It also includes machine code or any executable code. Code may exist in many forms, e.g. on a disk or in memory.

Dependency parameter: this term may mean a parameter of a function. Usually, this parameter is itself a function. For example, in C# a dependency parameter may be a parameter of type Func<int,int>. But it might also be a non-function parameter. For example, in C#, a dependency parameter might be a parameter of type int.

Function parameter: This term may mean a parameter. But in some context it may mean a parameter whose type is a function. For example, in C# a function parameter might be a parameter of type Func<int,int>.

Non-function parameter: This term means a parameter whose type is not a function. For example, in C#, a parameter of type Int32 is a non-function parameter.

Note: In some cases, a parameter of type say X can be considered a function parameter or a non-function parameter based on context. For example, a parameter of type Func<int,int> in C# is considered a function parameter. And is treated as a function parameter by default. However, it may be used as a non-function parameter. But such usage must be explicit. That is, special operators can be designed to explicitly treat what would otherwise be treated as a function parameter, as a non-function parameter.

Code generation: the process of creating new code. This is usually done by a processing device. Usually, there is some kind of input from users that affects the generation process. One kind of input is code. Another kind is settings. The input code and output code may be written in the same programming language or in different programming languages. The input code and/or output code may be be machine code or another type of executable code like Microsoft IL code or Java bytecode. Therefore, the process of compiling human-readable code into machine code or other types of executable code is considered code generation.

Function: a piece of code that does something and may also return something. Examples include methods in C#, and functions in F#. Other examples are anonymous methods and lambda expressions in C#. When the term function is used, it may refer to a reference to a function, for example, when a composition operator operates on a function, the operator may receive a reference to the function by using the function name. Also, the result of a composition operator is also a function. Such result might be stored into a variable and thus the variable represents a function. The expression of using a composition operator is also considered a function because its result is a function.

Composition operator: An operator that acts on one or more functions and results in new functions (usually one function). This definition does not limit the way in which functions may be composed together. Further, an example of the composition operator is the F# composition operator (>>). Another example is the HonestlyInject method (or operator) introduced in the patent application. Another example is the RenameParameter operator that operates on a single function and results in another function where at least one parameter of the single function is renamed. This last example gives the word "composition" a meaning closer to "manipulation". That is, we manipulate a single function to rename one of its parameters (this results in a new function with a renamed parameter, the original function parameter name is not modified).

This definition does not limit how an operator is implemented. In some programming languages, for example, there are special keywords or symbols for some operators, while other operators may be implemented as functions (i.e., a function may be defined to take functions as inputs and return one or more functions as output).

Composition code: A piece of code that uses at least one composition operator to act on at least one function. Examples are:

1. In F# where add1 and times2 are functions:
let add1Times2=add1>>times2
2. In an example embodiment of the present disclosure where there exists a Visual Studio extension that generates code for the HonestlyInject operator as a C# extension method:
var resultingFunction=function1.HonestlyInject(read: readFunction);

The following is an example of composition code, and code generated using an embodiment of the present disclosure describing a system and method for generating the code for software.

Here is the composition code (and some defined functions):

```
public class Function1
{
    public void Invoke(Func<bool, int> f, int a) =>
        Console.WriteLine(f(true) + a);
}
public class Function2
{
    public int Invoke(bool x, string b) => b.Length + 1 + (x ? 1: 2);
}
public class Program
{
    public static void Main( )
    {
        var resultingFunction =
            new Function1( ).HonestlyInject(f: new Function2( ));
        resultingFunction.Invoke(b: "book", a: 2);
    }
}
And here is the new generated code:
public static class HonestlyInjectExtensionMethods1
{
    public static HonestlyInjectClass HonestlyInject(
        this Function1 f1,
        Function2 f)
    {
        return new HonestlyInjectClass(f1, f);
    }
    public sealed class HonestlyInjectClass
    {
        private readonly Function1 f1;
        private readonly Function2 f2;
        public HonestlyInjectClass(Function1 f1, Function2 f2)
        {
            this.f1 = f1;
            this.f2 = f2;
        }
        public void Invoke(string b, int a)
        {
            f1.Invoke(arg => f2.Invoke(arg, b), a);
        }
    }
}
```

The composition operator in the composition code in this example is called HonestlyInject. In this example, functions are modeled as classes with a single method called Invoke.

The first function in this example is called Function1. It has a function parameter called f, and a non-function parameter called a. The function parameter f is a function that takes a Boolean and returns an integer.

The second function in this example is called Function2. It has two parameters, x of type Boolean and b of type string.

The second function (or the Invoke method of the second function) cannot be used as a direct value for the f dependency parameter because there is an incompatibility between Function2 and f. The incompatibility, in this case, is that Function2 has an extra parameter b of type string.

The generated code consists of a static class called HonestlyInjectExtensionMethods1. This class contains a generated HonestlyInject extension method. The second parameter of this method is called f. This exactly matches the name of the dependency parameter that was selected explicitly in the composition code.

The generated HonestlyInject method returns an instance of a newly generated class called HonestlyInjectClass. HonestlyInjectClass has two fields and a constructor. The fields store references to the relevant two functions. The HonestlyInjectClass class contains an Invoke method. Because in this embodiment, functions are modeled as classes with a single method called Invoke, this class will be considered a function. The Invoke method has two parameters, b and a.

We can consider this HonestlyInjectClass function as a modified version of Function1. The dependency parameter f was removed. And an additional parameter b was added.

When the Invoke method of the HonestlyInjectClass class (function) is called, it passes a lambda (arg=>f2.Invoke(arg, b)) as the value for the first parameter (f) of Function1. And it passes the "a" parameter, as is, as the value for the second parameter of Function1.

The lambda value here is a fix for the incompatibility. When HonestlyInjectClass is invoked, the lambda would be a fit for the dependency parameter required by Function1. The lambda invokes Function2. Some values passed to Function2 come from the values passed to the function parameter itself, e.g. arg. Other values come from the parameters of HonestlyInjectClass.Invoke.

Had there been extra parameters in Function2 that have no matching parameters in the dependency parameter f in Function1, HonestlyInjectClass.Invoke would contain these parameters and would pass them to Function2 inside the lambda.

The following is an example of composition code, and code generated using an embodiment of the present disclosure describing a system and method for generating the code for software.

Here is the composition code (and some defined functions):

```
public class Function1
{
    public void Invoke(int c, int a) => Console.WriteLine(c + a);
}
public class Function2
{
    public int Invoke(string b) => b.Length + 1;
}
public class Program
{
    public static void Main( )
    {
        var resultingFunction =
            new Function1( ).HonestlyReplace(c: new Function2( ));
        resultingFunction.Invoke(b: "book", a: 2);
    }
}
And here is the new generated code:
public static class HonestlyReplaceExtensionMethods1
{
        public static HonestlyReplaceClass HonestlyReplace(
            this Function1 f1,
            Function2 c)
        {
            return new HonestlyReplaceClass(f1, c);
        }
        public sealed class HonestlyReplaceClass
        {
            private readonly Function1 f1;
            private readonly Function2 f2;
            public HonestlyReplaceClass(Function1 f1, Function2 f2)
            {
                this.f1 = f1;
                this.f2 = f2;
            }
            public void Invoke(string b, int a)
            {
                f1.Invoke(f2.Invoke(b), a);
            }
        }
}
```

The composition operator in the composition code in this example is called HonestlyReplace. In this example, functions are modeled as classes with a single method called Invoke.

The first function in this example is called Function1. It has two non-function parameters: c and a. The parameters c and a are both of type int.

The second function in this example is called Function2. It has a single parameter called b and is of type string. Function2 has a return type of int.

The HonestlyReplace operator is used in the composition code in order to produce a resultant function that is a modified version of Function1. This resultant function will not have the dependency parameter c and will have (once generated) all the inputs of Function2 which in this example is the parameter b. The resultant function in this example is the generated HonestlyReplaceClass class.

The generated code is a static class called HonestlyReplaceExtensionMethods 1. It contains an extension method called HonestlyReplace. The second parameter of this extension method is called c which exactly matches the name of the dependency parameter selected explicitly in the composition code. This method returns a new instance of the generated HonestlyReplaceClass class.

HonestlyReplaceClass has two fields and a constructor. The fields store references to the relevant two functions. The HonestlyReplaceClass class contains an Invoke method. Because in this embodiment, functions are modeled as classes with a single method called Invoke, this class will be considered a function. The Invoke method has two parameters, b and a. We can consider this HonestlyReplaceClass function as a modified version of Function1. The dependency parameter c was removed. And an additional parameter b was added.

When the Invoke method of HonestlyReplaceClass is called, Function2 (f2) is called first. The parameter b is used when calling f2. Then the output of f2 is used as a value for the dependency parameter c when calling Function1 (f1). The parameter "a" is passed as is to f1.

If Function2 has had additional parameters, HonestlyReplaceClass.Invoke would have these parameters as well and would have passed them to f2 when invoking f2.

Referring now to figures, FIG. 1 is an illustration of an online platform 100 consistent with various embodiments of the present disclosure. By way of non-limiting example, the online platform 100 to generate code for software may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), and databases 114 over a communication network 104, such as, but not limited to, the Internet. Further, users of the online platform 100 may include relevant parties such as, but not limited to, end-users, users, administrators, and so on. Accordingly, in some instances, electronic devices operated by the one or more relevant parties may be in communication with the platform 100.

A user 112, such as the one or more relevant parties, may access online platform 100 through a web-based software application or browser. The web-based software application may be embodied as, for example, but not be limited to, a website, a web application, a desktop application, and a mobile application compatible with a computing device 400.

Figure 2:
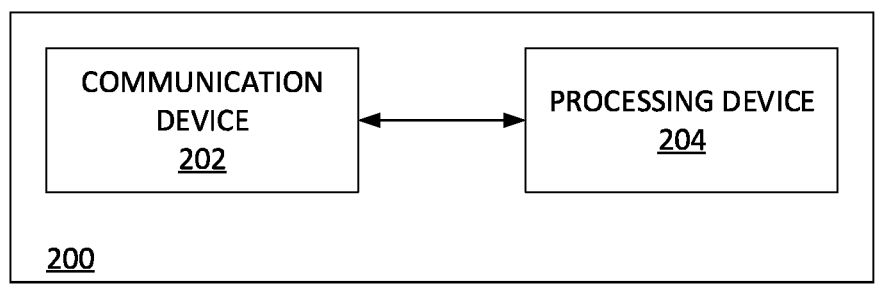
FIG. 2 is a block diagram of a system for generating code to enable a honest/flexible functional dependency injection approach, in accordance with some embodiments.

FIG. 2 is a block diagram of a system 200 for generating code to enable a honest/flexible functional dependency injection approach, in accordance with some embodiments. Further, the system 200 may include a communication device 202 and a processing device 204.

Further, the communication device 202 may be configured for receiving a composition code from a user device (such as the mobile device 106, the electronic devices 110, etc.). Further, the composition code may be associated with at least one programming language or at least one program. Further, the at least one programming language may include at least one high-level programming language. Further, the at least one high-level programming language may include C#, F#, etc. Further, the user device may be associated with at least one user. Further, the at least one user may include an individual and an institution that may want to generate the code. Further, the user device may include a computing device such as a smartphone, a laptop, a desktop, a tablet, a smartwatch, etc. Further, the composition code contains a usage of a composition operator. Further, the composition operator, in an instance, may include a HonestlyInject operator, and a HonestlyReplace operator. Other operators like a JoinInputs operator, an AggregateIndirectOutput operator, a HonestlyInjectOne operator, a HonestlyInjectLast operator, and a RenameParameter operator, etc., maybe be used to make it easier to work with function composition. Further, the composition operator may be associated with at least two functions. Further, a first function of the at least two functions may include a dependency parameter. Further, the dependency parameter may include a function parameter or a non-function parameter. Further, the dependency parameter may be selected implicitly or explicitly in the composition code. Further, a second function of the at least two functions provides a value for the dependency parameter. Further, the second function may not be used as a direct value for the dependency parameter. Further, the second function of the at least two functions may include at least one incompatibility in relation to the dependency parameter of the first function based on the dependency parameter comprising the function parameter. Further, the second function of the at least two functions may include an output and the output provides a value for the dependency parameter based on the dependency parameter comprising the non-function parameter. Further, the communication device 202 may be configured for transmitting a new code to the user device.

Further, the processing device 204 may be communicatively coupled with the communication device 202. Further, the processing device 204 may be configured for analyzing the composition code. Further, the processing device 204 may be configured for generating the new code based on the analyzing. Further, the new code may be associated with at least one programming language or at least one program. Further, the at least one programming language may include at least one high-level programming language. Further, the at least one high-level programming language may include C#, F#, etc. Further, the code may include the new code. Further, the new code may be associated with the software. Further, the new code enables the composition operator for injecting the second function or the output of the second function as a value for the dependency parameter in the first function. Further, the injecting provides a resulting function. Further, the resulting function may be a modified version of the first function. Further, the modified version of the first function does not comprise the dependency parameter. Further, the resulting function may include at least one of at least one additional input parameter, at least one additional output, and at least one additional indirect output parameter based on the dependency parameter and the at least one incompatibility.

Further, in some embodiments, the second function may include a plurality of second functions. Further, the dependency parameter of the first function may include a plurality of dependencies. Further, the new code enables the composition operator for injecting the plurality of second functions or outputs of the plurality of second functions as values of the plurality of dependencies in the first function.

Further, in some embodiments, the dependency parameter may include the function parameter. Further, the at least one incompatibility may include at least one of at least one extra input parameter in relation to the dependency parameter of the first function, at least one missing input parameter in relation to the dependency parameter of the first function, and at least one extra output in relation to the dependency parameter of the first function. Further, the second function may include the at least one of the at least one extra input parameter, the at least one missing input parameter, and the at least one extra output.

Further, in an embodiment, Further, the processing device 204 may be configured for matching at least one input of the dependency parameter with at least one input of the second function based on an implicit conversion of at least one of the at least one input of the dependency parameter and the at least one input of the second function in a right direction.

Further, in an embodiment, the processing device 204 may be configured for matching at least one output of the dependency parameter with at least one output of the second function based on an implicit conversion of at least one of the at least one output of the dependency parameter and the at least one output of the second function in a right direction.

Further, in some embodiments, the dependency parameter may include the non-function parameter. Further, the new code enables the composition operator to provide a resultant function based on a usage of the output of the second function as the value for the dependency parameter. Further, the resultant function may be a modified version of the first function. Further, the modified version of the first function does not comprise the dependency parameter. Further, the modified version may include all inputs of the second function. Further, the resultant function may be configured for calling the second function to obtain the output of the second function. Further, the resultant function may be configured for passing the output as a value for the dependency parameter of the first function to the first function.

Further, in some embodiments, at least one parameter of the at least two functions may include at least one name. Further, the at least one name may be preserved during the generation of the resulting function.

Further, in some embodiments, a validity of a usage of at least one operator associated with the composition code may be determined at run time.

Figure 3:
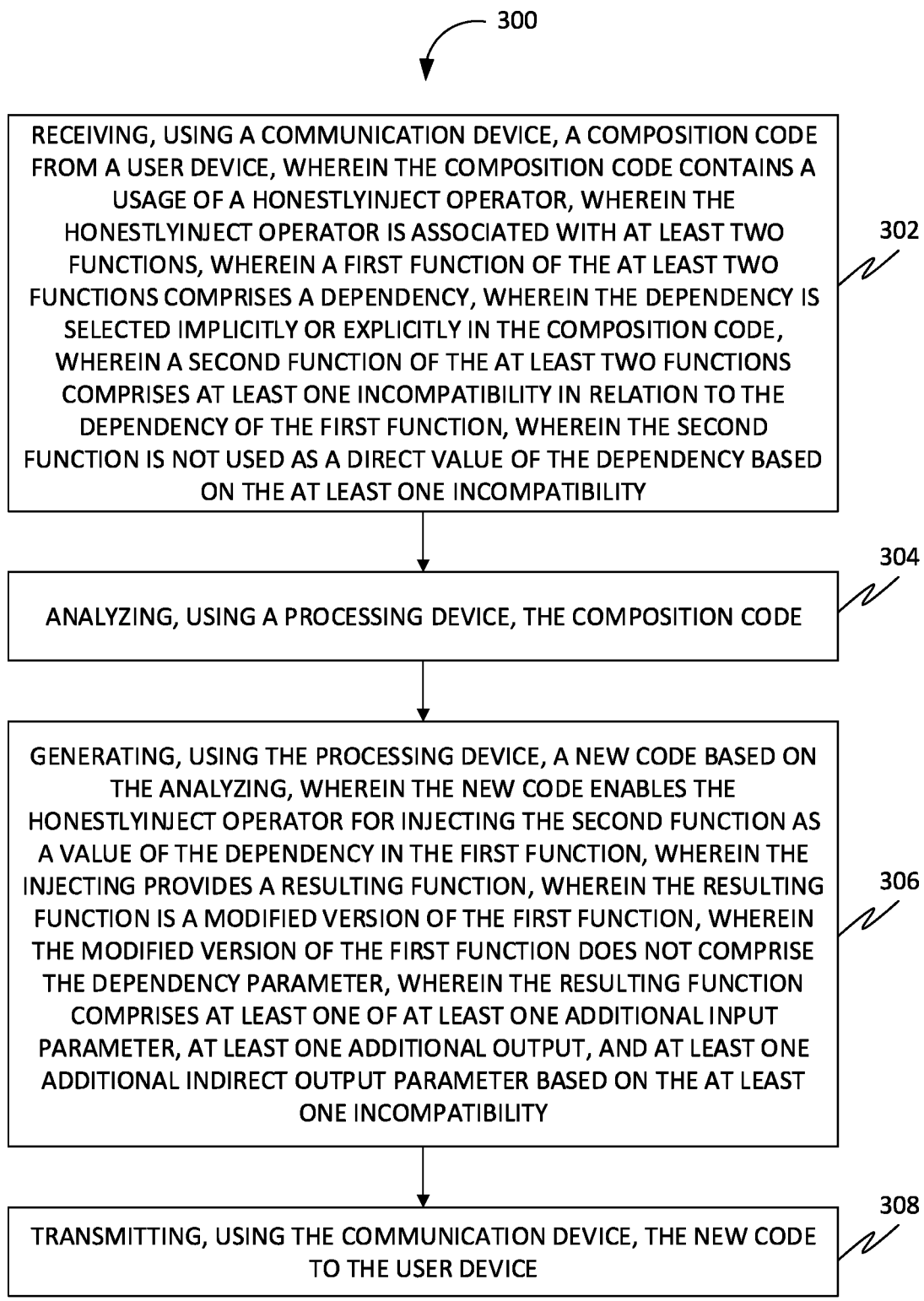
FIG. 3 is a flowchart of a method for generating code to enable a honest/flexible functional dependency injection approach, in accordance with some embodiments.

FIG. 3 is a flowchart of a method 300 for generating code to enable a honest/flexible functional dependency injection approach, in accordance with some embodiments. At 302, the method 300 may include receiving, using a communication device (such as the communication device 202), a composition code from a user device. Further, the composition code may be associated with at least one programming language or at least one program. Further, the at least one programming language may include at least one high-level programming language. Further, the at least one high-level programming language may include C#, F#, etc. Further, the user device may be associated with at least one user. Further, the at least one user may include an individual and an institution that may want to generate the code. Further, the user device may include a computing device such as a smartphone, a laptop, a desktop, a tablet, a smartwatch, etc. Further, the composition code contains a usage of a composition operator. Further, the composition operator, in an instance, may include a HonestlyInject operator, and a HonestlyReplace operator. Other operators like a JoinInputs operator, an AggregateIndirectOutput operator, a HonestlyInjectOne operator, a HonestlyInjectLast operator, a RenameParameter operator, etc., may be used to make it easier to compose functions. Further, the composition operator may be associated with at least two functions. Further, a first function of the at least two functions may include a dependency parameter. Further, the dependency parameter may include a function parameter or a non-function parameter. Further, the dependency parameter may be selected implicitly or explicitly in the composition code. Further, a second function of the at least two functions provides a value for the dependency parameter. Further, the second function may not be used as a direct value for the dependency parameter. Further, the second function of the at least two functions may include at least one incompatibility in relation to the dependency parameter of the first function based on the dependency parameter comprising the function parameter. Further, the second function of the at least two functions may include an output and the output provides a value for the dependency parameter based on the dependency parameter comprising the non-function parameter.

Further, at 304, the method 300 may include analyzing, using a processing device (such as the processing device 204), the composition code.

Further, at 306, the method 300 may include generating, using the processing device, a new code based on the analyzing. Further, the new code may be associated with at least one programming language or at least one program. Further, the at least one programming language may include at least one high-level programming language. Further, the at least one high-level programming language may include C#, F#, etc. Further, the code may include the new code. Further, the new code may be associated with the software. Further, the new code enables the composition operator for injecting the second function or the output of the second function as a value for the dependency parameter in the first function. Further, the injecting provides a resulting function. Further, the resulting function may be a modified version of the first function. Further, the modified version of the first function does not comprise the dependency parameter. Further, the resulting function may include at least one of at least one additional input parameter, at least one additional output, and at least one additional indirect output parameter based on the dependency parameter and the at least one incompatibility.

Further, at 308, the method 300 may include transmitting, using the communication device, the new code to the user device.

Further, in some embodiments, the second function may include a plurality of second functions. Further, the dependency parameter of the first function may include a plurality of dependencies. Further, the new code enables the composition operator for injecting the plurality of second functions or outputs of the plurality of second functions as values of the plurality of dependencies in the first function.

Further, in some embodiments, the dependency parameter may include the function parameter. Further, the at least one incompatibility may include at least one of at least one extra input parameter in relation to the dependency parameter of the first function, at least one missing input parameter in relation to the dependency parameter of the first function, and at least one extra output in relation to the dependency parameter of the first function. Further, the second function may include the at least one of the at least one extra input parameter, the at least one missing input parameter, and the at least one extra output.

In further embodiments, the method 300 may include matching, using the processing device, at least one input of the dependency parameter with at least one input of the second function based on an implicit conversion of at least one of the at least one input of the dependency parameter and the at least one input of the second function in a right direction.

In further embodiments, the method 300 may include matching, using the processing device, at least one output of the dependency parameter with at least one output of the second function based on an implicit conversion of at least one of the at least one output of the dependency parameter and the at least one output of the second function in a right direction.

Further, in some embodiments, the dependency parameter may include the non-function parameter. Further, the new code enables the composition operator to provide a resultant function based on a usage of the output of the second function as the value for the dependency parameter. Further, the resultant function may be a modified version of the first function. Further, the modified version of the first function does not comprise the dependency parameter. Further, the modified version may include all inputs of the second function. Further, the resultant function may be configured for calling the second function to obtain the output of the second function. Further, the resultant function may be configured for passing the output as a value for the dependency parameter of the first function to the first function.

Further, in some embodiments, at least one parameter of the at least two functions may include at least one name. Further, the at least one name may be preserved during the generation of the resulting function.

Further, in some embodiments, a validity of a usage of at least one operator associated with the composition code may be determined at run time.

According to some embodiments, a non-transitory computer-readable medium comprising computer-executable instructions which when executed on a processing device (such as the processing device 204) performs a method for generating code to enable a honest/flexible functional dependency injection approach. Further, the method may include receiving, using the processing device, a composition code. Further, the composition code contains a usage of a composition operator. Further, the composition operator may be associated with at least two functions. Further, a first function of the at least two functions may include a dependency parameter. Further, the dependency parameter may include a function parameter or a non-function parameter. Further, the dependency parameter may be selected implicitly or explicitly in the composition code. Further, a second function of the at least two functions provides a value for the dependency parameter. Further, the second function may not be used as a direct value for the dependency parameter. Further, the second function of the at least two functions may include at least one incompatibility in relation to the dependency parameter of the first function based on the dependency parameter comprising the function parameter. Further, the second function of the at least two functions may include an output and the output provides a value for the dependency parameter based on the dependency parameter comprising the non-function parameter. Further, the method may include analyzing, using the processing device, the composition code. Further, the method may include generating, using the processing device, a new code based on the analyzing. Further, the new code enables the composition operator for injecting the second function or the output of the second function as a value for the dependency parameter in the first function. Further, the injecting provides a resulting function. Further, the resulting function may be a modified version of the first function. Further, the modified version of the first function does not comprise the dependency parameter. Further, the resulting function may include at least one of at least one additional input parameter, at least one additional output, and at least one additional indirect output parameter based on the dependency parameter and the at least one incompatibility. Further, the method may include storing, using a storage device, the new code.

Further, in some embodiments, the second function may include a plurality of second functions. Further, the dependency parameter of the first function may include a plurality of dependencies. Further, the new code enables the composition operator for injecting the plurality of second functions or outputs of the plurality of second functions as values of the plurality of dependencies in the first function.

Further, in some embodiments, the dependency parameter may include the function parameter. Further, the at least one incompatibility may include at least one of at least one extra input parameter in relation to the dependency parameter of the first function, at least one missing input parameter in relation to the dependency parameter of the first function, and at least one extra output in relation to the dependency parameter of the first function. Further, the second function may include the at least one of the at least one extra input parameter, the at least one missing input parameter, and the at least one extra output.

Further, in an embodiment, the dependency parameter of the first function represents a plurality of functions. Further, the new code enables the composition operator for injecting the second function as a value for the dependency parameter. Further, the injecting of the second function as the value for the dependency parameter causes the resulting function to contain the dependency parameter. Further, a resulting dependency parameter represents a plurality of functions.

Further, in an embodiment, the dependency parameter of the first function represents a plurality of functions. Further, the new code enables the composition operator for injecting the second function as an only value in the dependency parameter.

Further, in some embodiments, the dependency parameter may include the non-function parameter. Further, the new code enables the composition operator to provide a resultant function based on a usage of the output of the second function as the value for the dependency parameter. Further, the resultant function may be a modified version of the first function. Further, the modified version of the first function does not comprise the dependency parameter. Further, the modified version may include all inputs of the second function. Further, the resultant function may be configured for calling the second function to obtain the output of the second function. Further, the resultant function may be configured for passing the output as a value for the dependency parameter of the first function to the first function.

Further, in some embodiments, the new code may be associated with a first programming language and the composition code may be associated with a second programming language. Further, the first programming language and the second programming language are dissimilar.

Further, in some embodiments, the new code may be associated with a first programming language and the composition code may be associated with a second programming language. Further, the first programming language and the second programming language are similar.

Further, in some embodiments, the new code may be at least one of a machine code and an executable code. Further, the machine code may be a result of compilation.

Further, in some embodiments, the composition code contains a usage of at least one of a JoinInputs operator, an AggregateIndirectOutput operator, a RenameParameter operator, and a MakeOutputIndirect operator.

Further, in an embodiment, the composition code contains a usage of an additional operator. Further, the additional operator converts an input of a function from a direct form to an indirect form or vice versa.

Further, in some embodiments, the composition operator may be built into a programming language. Further, the programming language may be associated with the composition code. Further, the composition operator may be defined as at least one of a method, a function, and a programming language construct. Further, the at least one of the method, the function, the programming language construct may be associated with the programming language.

Further, in some embodiments, the composition operator may be associated with at least one name. Further, the composition operator may be called using the at least one name. Further, the at least one name may include at least one symbol.

Further, in some embodiments, at least one developer marks at least one function parameter. Further, the at least one function parameter may be called at most once or exactly once. Further, the method may include choosing, using the processing device, at least one type of at least one of a new input and a new output associated with the at least one function parameter.

Further, in an embodiment, a compiler associated with the composition code may be configured for determining a calling of the at least one function parameter without the mark by the at least one developer In further embodiments, the method may include matching, using the processing device, at least one input of the dependency parameter with at least one input of the second function based on an implicit conversion of at least one of the at least one input of the dependency parameter and the at least one input of the second function in a right direction.

In further embodiments, the method may include matching, using the processing device, at least one output of the dependency parameter with at least one output of the second function based on an implicit conversion of at least one of the at least one output of the dependency parameter and the at least one output of the second function in a right direction.

Further, in some embodiments, at least one parameter of the at least two functions may include at least one name. Further, the at least one name may be preserved during the generation of the resulting function.

Further, in some embodiments, at least one parameter of the first function may include at least one name. Further, the at least one name may be used to select the dependency parameter of the first function.

Further, in some embodiments, at least one parameter of the at least two functions may include at least one name. Further, the at least one name may be used to select at least one relevant parameter in at least one composition operator associated with the composition code.

Further, in some embodiments, at least one relevant parameter used in at least one composition operator may be selected based on at least one of a parameter index and a parameter type.

In further embodiments, the method may include generating, using the processing device, at least one visual tool. Further, the at least one visual tool facilitates working with at least one composition operator associated with the composition code.

Further, in some embodiments, a validity of a usage of at least one operator associated with the composition code may be determined at run time.

Figure 4:
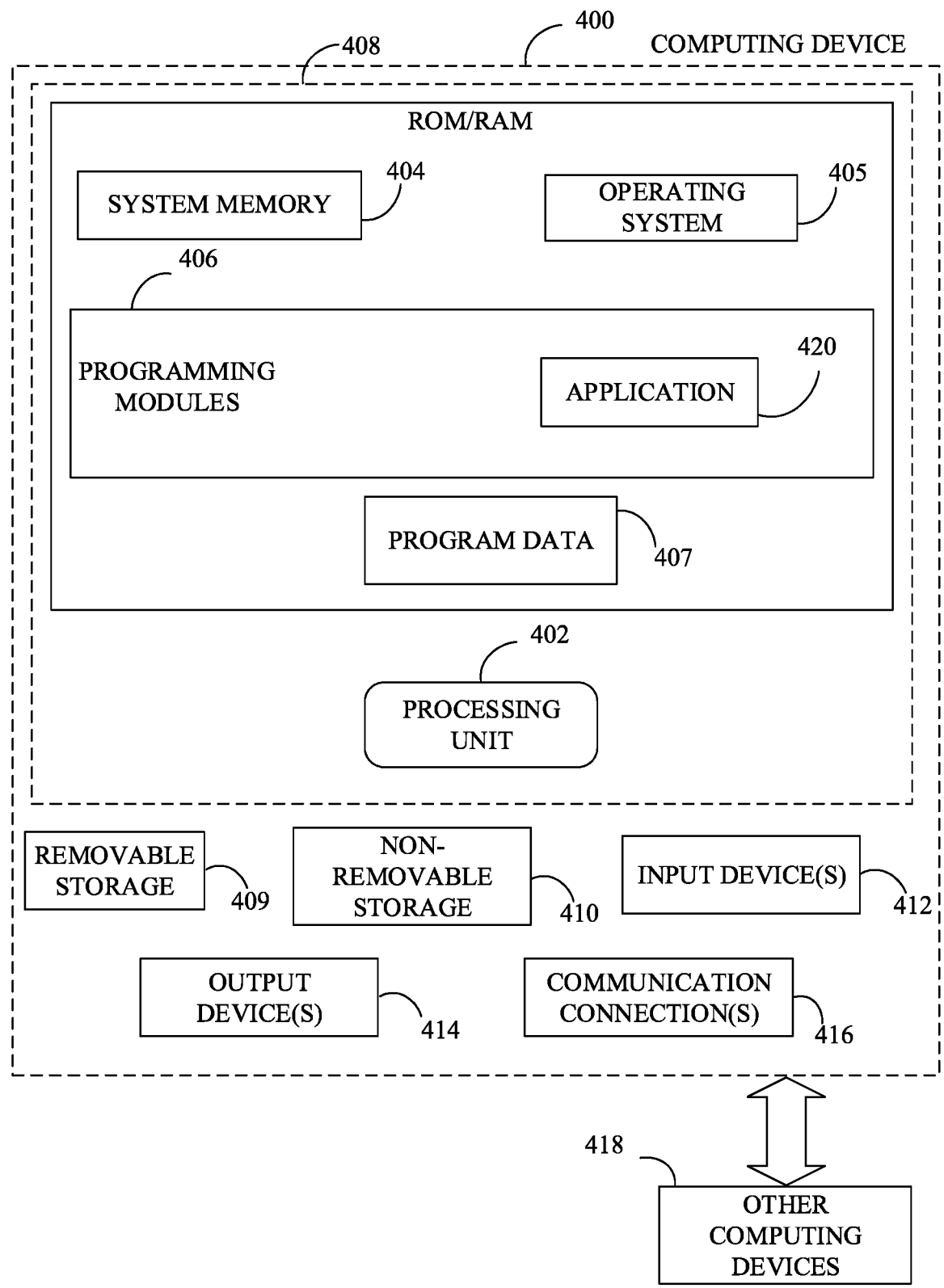
FIG. 4 is a block diagram of a computing device for implementing the methods disclosed herein, in accordance with some embodiments.

With reference to FIG. 4, a system consistent with an embodiment of the disclosure may include a computing device or cloud service, such as computing device 400. In a basic configuration, computing device 400 may include at least one processing unit 402 and a system memory 404. Depending on the configuration and type of computing device, system memory 404 may comprise, but is not limited to, volatile (e.g. random-access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include the image-processing module, machine learning module. Furthermore, embodiments of the disclosure may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and non-volatile, removable and non-removable media implemented in any method or technology for storage of information, such as computer-readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, a location sensor, a camera, a biometric sensor, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 404, including operating system 405. While executing on processing unit 402, programming modules 406 (e.g., application 420 such as a media player) may perform processes including, for example, one or more stages of methods, algorithms, systems, applications, servers, databases as described above. The aforementioned process is an example, and processing unit 402 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 5:
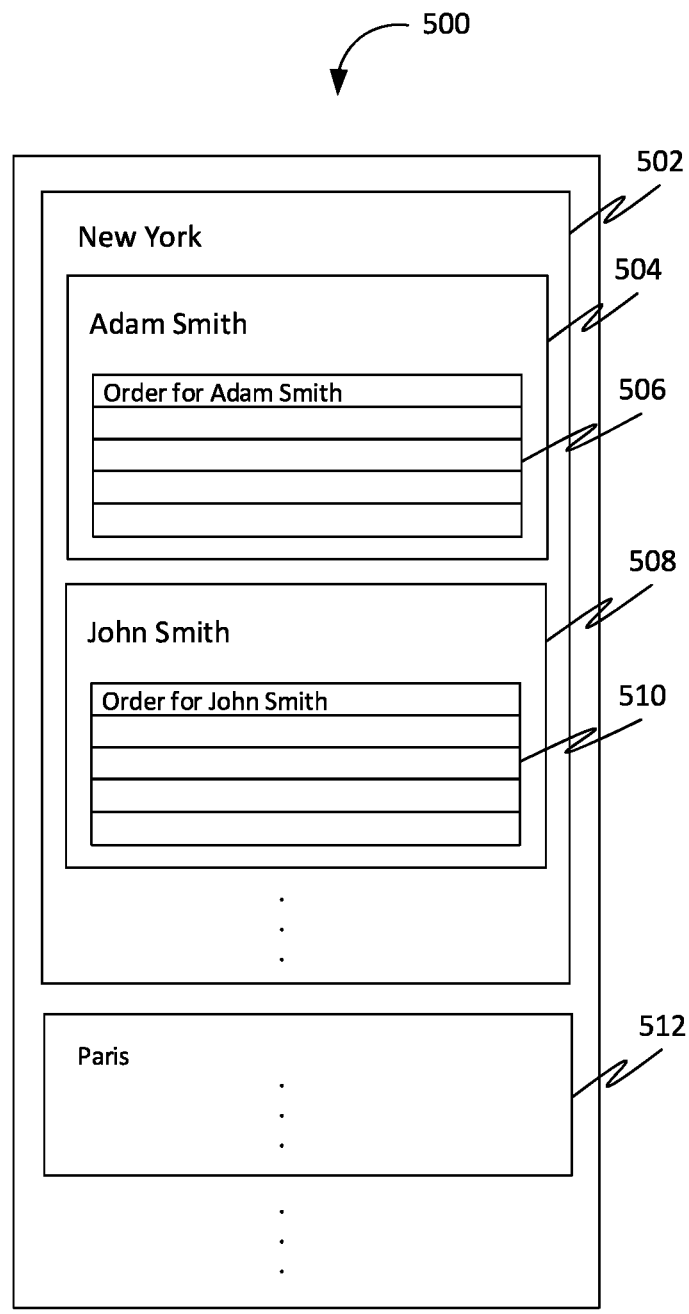
FIG. 5 is an illustration of a report structure of customer orders.

FIG. 5 is an illustration of a report structure 500 of customer orders. Further, the report structure 500 may include at least one city object. Further, the at least one city object may include a New York city object 502, a Paris city object 512, etc. Further, the New York city object 502 may include at least one customer object. Further, the at least one customer object represent customers living in the city. Further, the at least one customer object may include a Adam Smith customer object 504, a John Smith customer object 508, etc. Further, the at least one customer object may include at least one order object. Further, the at least one order object represent the order the customer has made. Further, the at least one order object may include an order for Adam Smith order object 506, an order for John Smith order object 510, etc.

Figure 6:
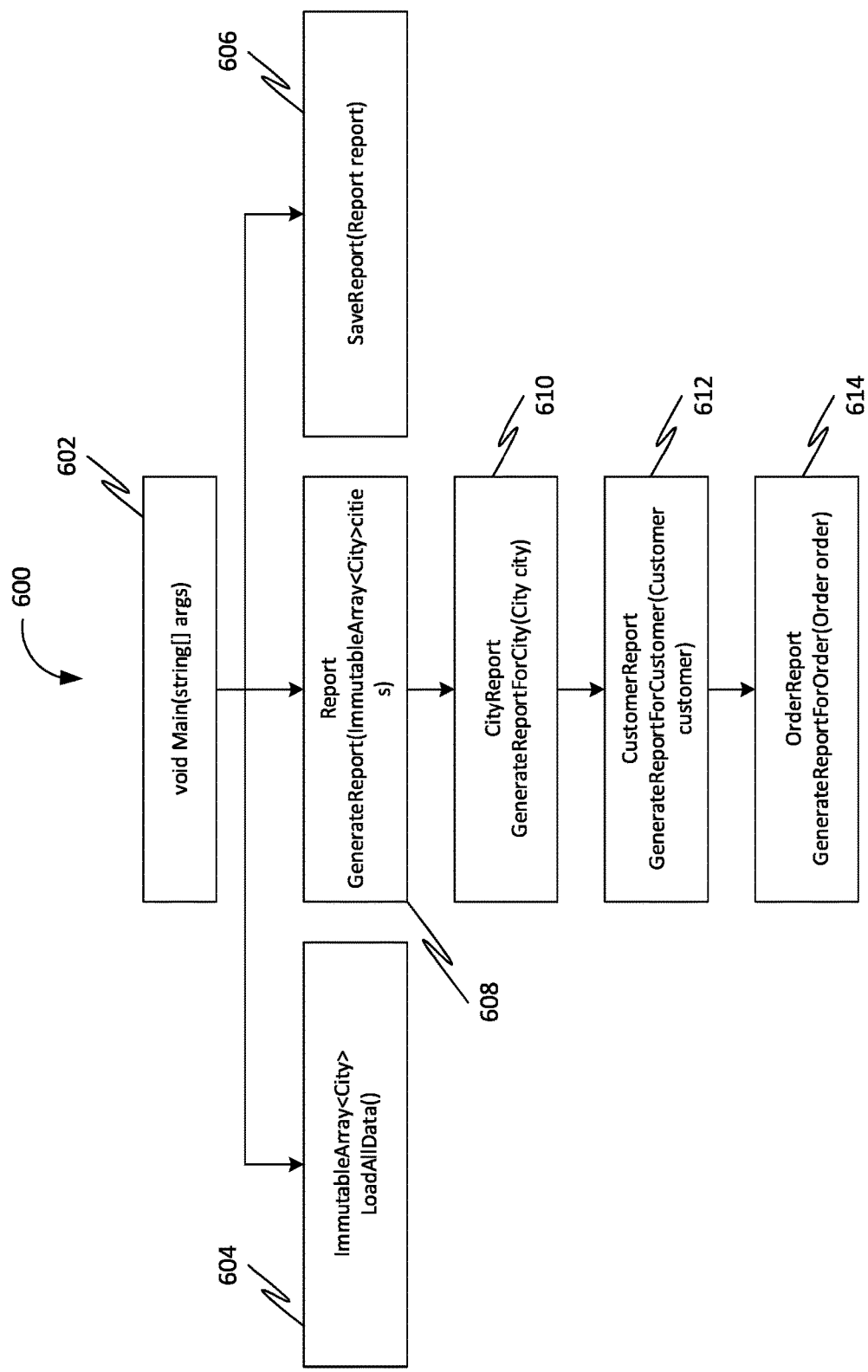
FIG. 6 is a flow diagram of a method call tree, in accordance with some embodiments.

FIG. 6 is a flow diagram of a method call tree 600, in accordance with some embodiments. Further, the method call tree 600 may include a main method 602. Further, the main method 602 may call a LoadAllData method 604, a GenerateReport method 608, and a SaveReport method 606. Further, the main method 602 starts by calling the LoadAllData method 604 to obtain all the data needed to generate the report from the database (such as the databases 114). Further, the main method 602 calls the GenerateReport method 608 passing in the array of City objects (such as the New York city object 502, the Paris city object 512, etc.) it got from the LoadAllData method 604. Further, the GenerateReport method 608 invokes a GenerateReportForCity method 610 for each City object to generate a sub-report for each city, and then it aggregates all these sub-reports to generate the full report. Further, the GenerateReport method 608 may add other information to the report such as the total number of cities, total number of customers, total number of orders, etc. Further, the GenerateReportForCity method 610 may call a GenerateReportForCustomer method 612 for each customer and then aggregates the results into a CityReport object. Further, the GenerateReportForCustomer method 612 may call a GenerateReportForOrder method 614 for each Order object. Further, at least one of the GenerateReportForCity method 610, the GenerateReportForCustomer method 612, and the GenerateReportForOrder method 614 organize the sub-reports in a different way. Further, the GenerateReportForCity method 610 may sort the customer reports by customer name, while the GenerateReportForCustomer method 612 might sort the order reports by date or total amount. Further, the GenerateReportForOrder method 614 returns an OrderReport object for the Order object it gets. Further, the returned report contains useful details about the order such as the products ordered, the total price for each product, the order total price, etc.

Further, the Main method 602 may have a pure body but it calls other methods that are impure. Further, the LoadAllData method 604 and the SaveReport method 606 may be impure. Further, the GenerateReport method 608, the GenerateReportForCity method 610, the GenerateReportForCustomer method 612, and the GenerateReportForOrder method 614 may be pure.

Further, the LoadAllData method 604 may be impure because the LoadAllData method 604 may communicate with the database. Further, the SaveReport method 606 may be impure because the SaveReport method 606 writes to the file system. Further, the Main method 602 may be impure because the Main method 602 invokes the LoadAllData method 604 and the SaveReport method 606. The other methods contain pure logic. Further, the LoadAllData method 604 may return some constant data. Also, the SaveReport method 606 simply outputs the report to the console.

Further, the code for the Main method 602 may include:

```
static void Main(string[ ] args) { var cities = LoadAllData( ); var report =
GenerateReport(cities); SaveReport(report); }
```

First, the impure LoadAllData method 604 may be invoked to get all the data needed to generate the report. Further, the pure GenerateReport method 608 may be invoked to generate the report. Further, the impure SaveReport method 606 may be invoked to save the report.

Figure 7:
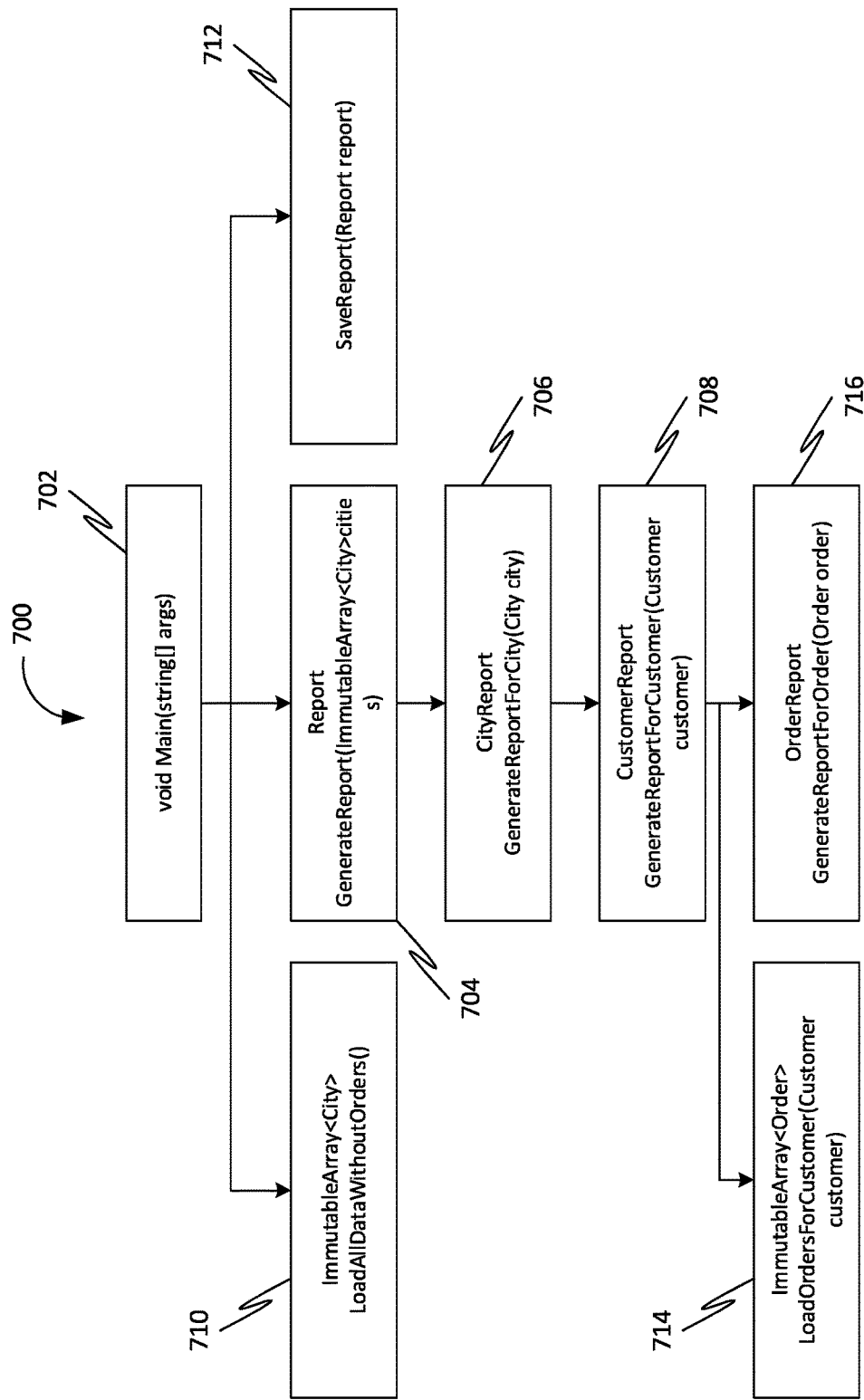
FIG. 7 is a flow diagram of a method call tree, in accordance with some embodiments.

FIG. 7 is a flow diagram of a method call tree 700, in accordance with some embodiments. Further, the method call tree 700 may include a Main method 702. Further, the Main method calls a LoadAllDataWithoutOrders method 710. Further, the Main method 702 calls a GenerateReport method 704. Further, the Main Method calls a SaveReport method 712. Further, the GenerateReport method 704 calls a GenerateReportForCity method 706. Further, the GenerateReportForCity method 706 calls a GenerateReportForCustomer method 708. Further, the GenerateReportForCustomer method 708 calls a LoadOrdersForCustomer method 714. Further, the GenerateReportForCustomer method 708 calls a GenerateReportForOrder method 716.

Further, the Main method 702 may have a pure body but it calls other methods that are impure. Further, the LoadAllDataWithoutOrders method 710 and the SaveReport method 712 may be impure. Further, the GenerateReport method 704, the GenerateReportForCity method 706, and the GenerateReportForCustomer method 708 may have a pure body but it calls other methods that are impure. Further, the LoadOrdersForCustomer may be impure. Further, the GenerateReportForOrder method 716 may be pure.

Figure 8:
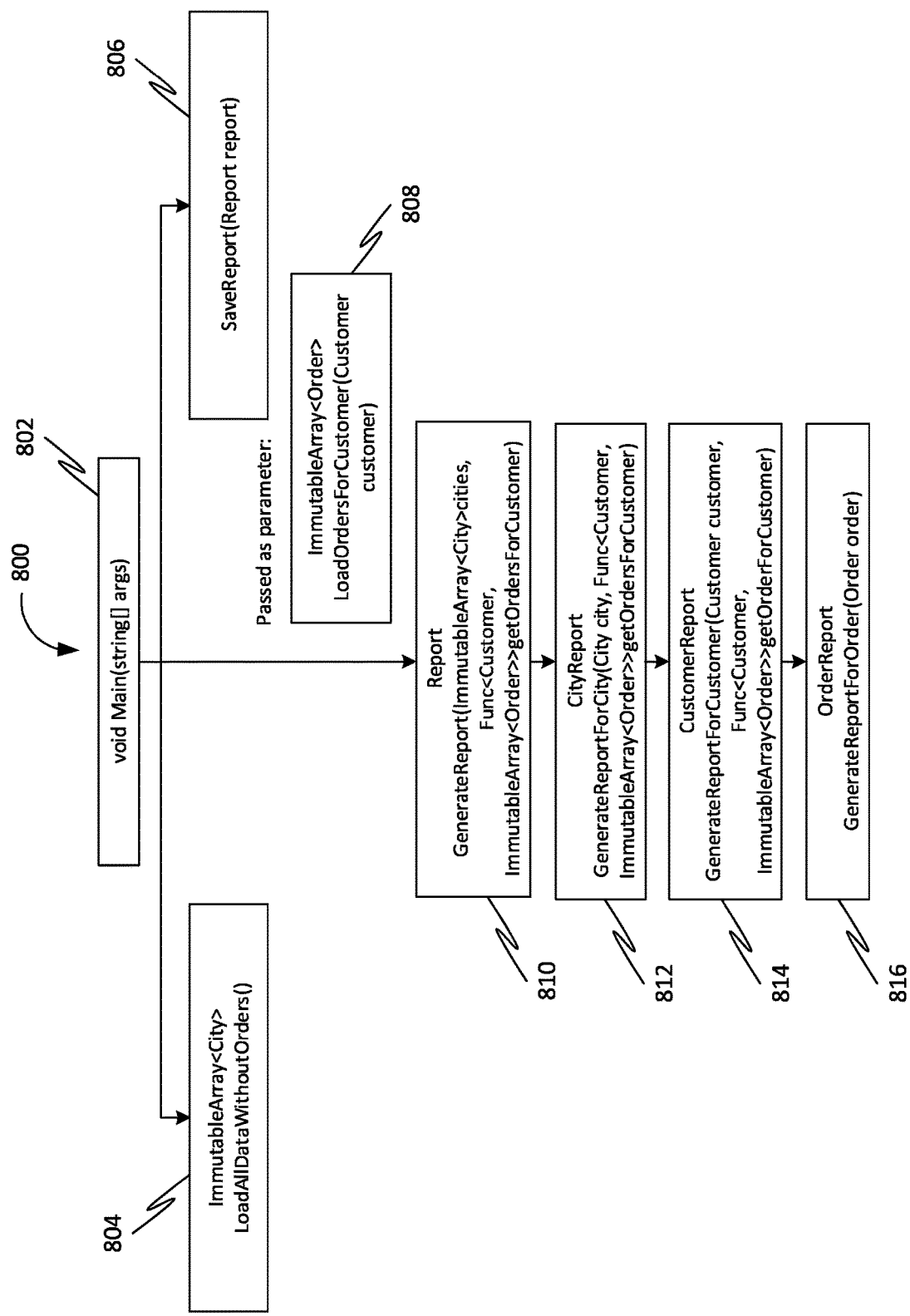
FIG. 8 is a flow diagram of a method call tree with potentially-pure methods, in accordance with some embodiments.

FIG. 8 is a flow diagram of a method call tree 800 with potentially-pure methods, in accordance with some embodiments. Further, the method call tree 800 may include a Main method 802. Further, the Main method 802 calls a LoadAllDataWithoutOrders method 804. Further, the Main method 802 calls a GenerateReport method 810. Further, the Main method 802 calls a SaveReport method 806. Further, the GenerateReport method 810 calls a GenerateReportForCity method 812. Further, the GenerateReportForCity method 812 calls a GenerateReportForCustomer method 814. Further, the GenerateReportForCustomer method 814 calls a GenerateReportForOrder method 816. Further, the Main method 802 passes a LoadOrdersForCustomer method 808 as an argument for a getOrdersForCustomer parameter when the Main method 802 calls the GenerateReport method 810 for making the GenerateReport method 810, the GenerateReportForCity method 812, and the GenerateReportForCustomer method 814 potentially pure. Further, the GenerateReport method 810, the GenerateReportForCity method 812, and the GenerateReportForCustomer method 814 passes the getOrdersForCustomer parameter down the call stack of the method call tree 800. Further, the GenerateReportForOrder method 816 may be pure. Further, the LoadAllDataWithoutOrders method 804 and the SaveReport method 806 may be impure.

Figure 9:
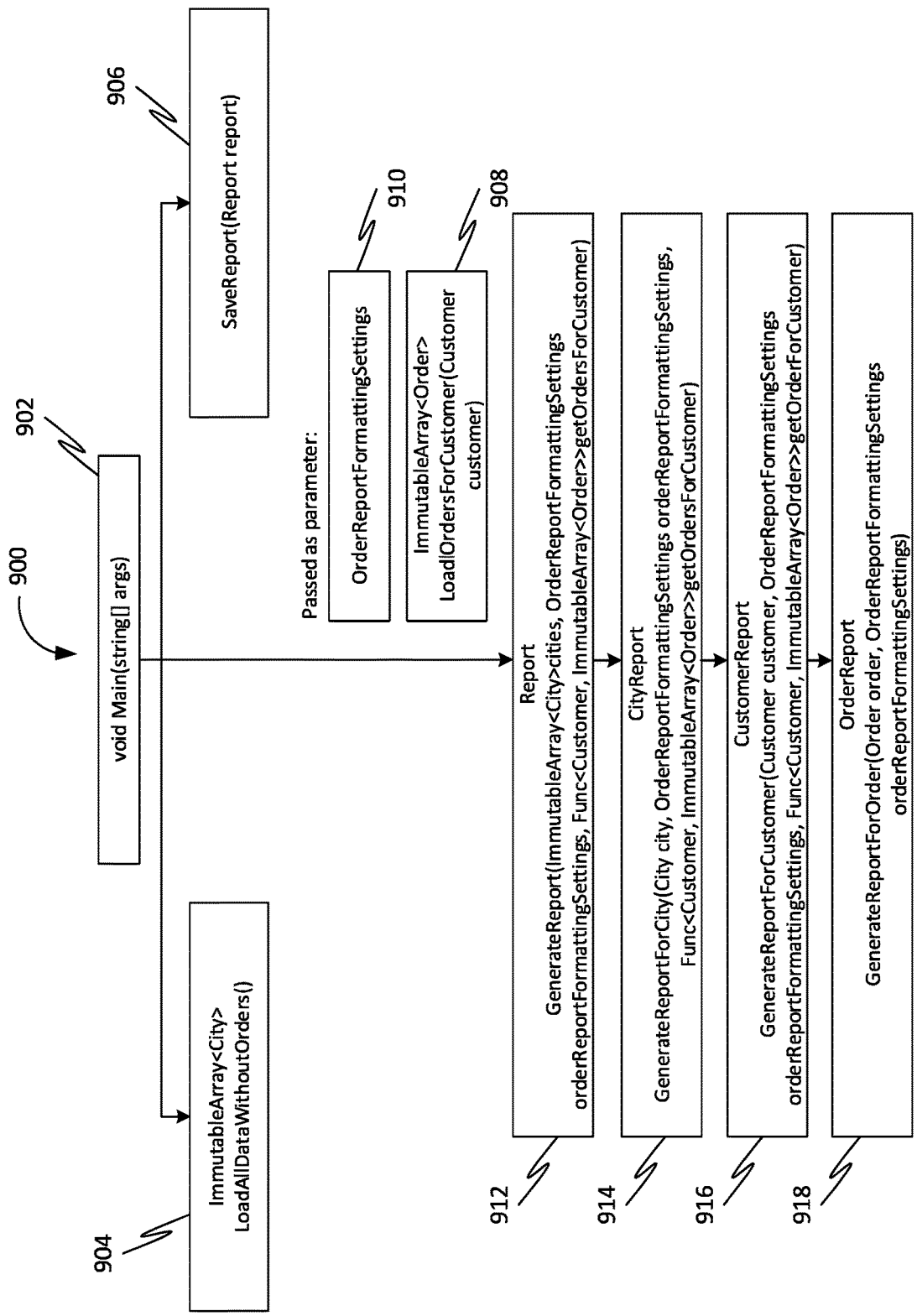
FIG. 9 is a flow diagram of a method call tree with added parameters, in accordance with some embodiments.

FIG. 9 is a flow diagram of a method call tree 900 with added parameters, in accordance with some embodiments. Further, the method call tree 900 may include a Main method 902. Further, the Main method 902 calls a LoadAllDataWithoutOrders method 904. Further, the Main method 902 calls a SaveReport method 906. Further, the Main method 902 calls a GenerateReport method 912. Further, the GenerateReport method 912 calls a GenerateReportForCity method 914. Further, the GenerateReportForCity method 914 calls a GenerateReportForCustomer method 916. Further, the GenerateReportForCustomer method 916 calls a GenerateReportForOrder method 918. Further, the Main method 902 passes a LoadOrdersForCustomer method 908 as an argument for a getOrdersForCustomer parameter when the Main method 902 calls the GenerateReport method 912. Further, the method call tree 900 may include OrderReportFormattingSettings class 910. Further, the OrderReportFormattingSettings class 910 may be passing through the GenerateReport method 912, the GenerateReportForCity method 914, and the GenerateReportForCustomer method 916 to the GenerateReportForOrder method 918.

Figure 10:
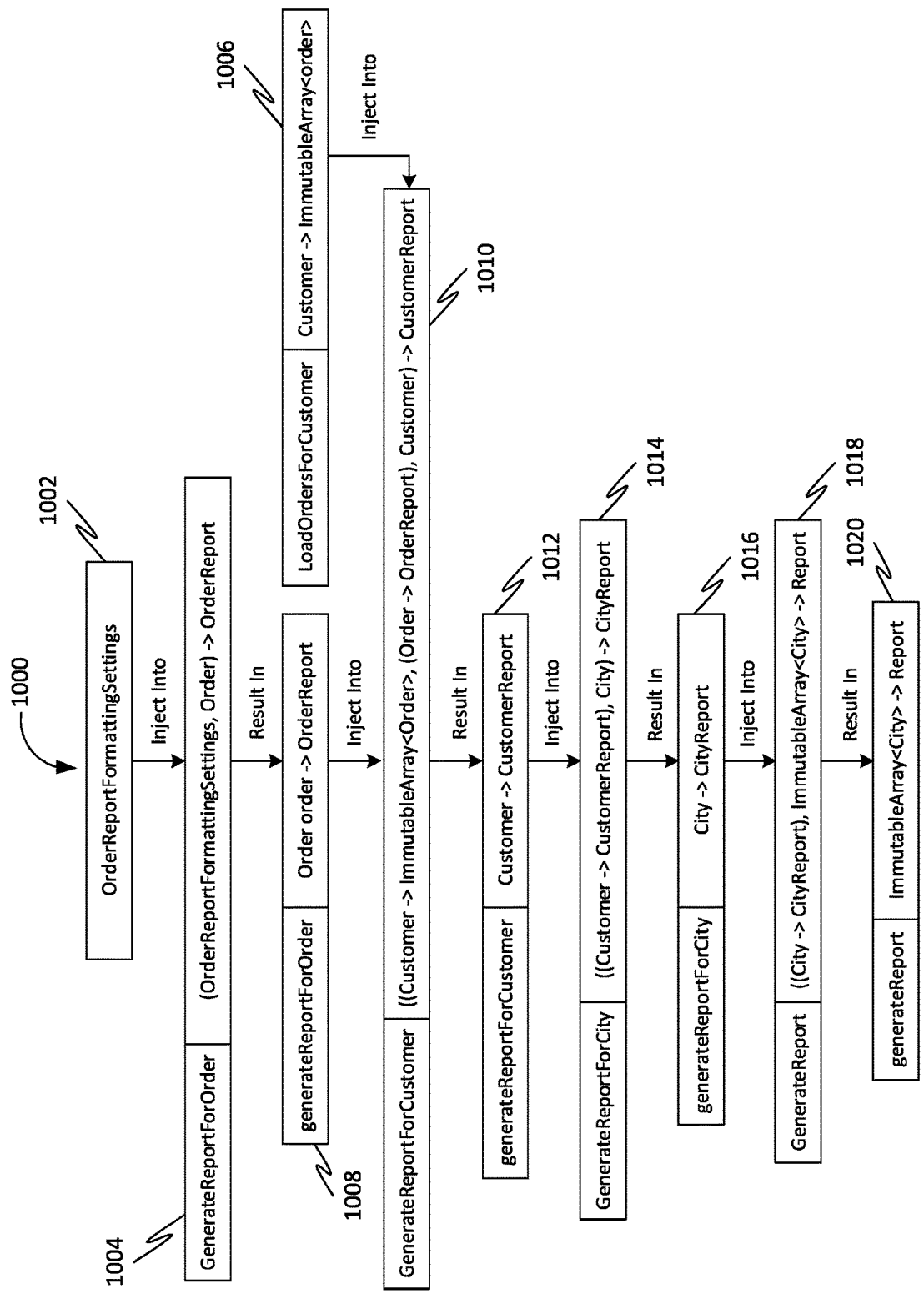
FIG. 10 is a flow diagram of a Composition Root (the Main method) using Partial Invocation (partial application), in accordance with some embodiments.

FIG. 10 is a flow diagram of a Composition Root (the Main method) 1000 using Partial Invocation (partial application), in accordance with some embodiments. Further, the Composition Root 1000 may include a PartiallyInvoke method to inject a first function of the plurality of functions into a second function of the plurality of functions. Further, the Composition Root 1000 may include injecting a OrderReportFormattingSettings function 1002 into a GenerateReportForOrder function 1004 resulting in a GenerateReportForOrder function 1008. Further, the Composition Root 1000 may include injecting the GenerateReportForOrder function 1008 and a LoadOrdersForCustomer function 1006 into a GenerateReportForCustomer function 1010 resulting in a GenerateReportForCustomer function 1012. Further, the Composition Root 1000 may include injecting the GenerateReportForCustomer function 1012 into a GenerateReportForCity function 1014 resulting in a GenerateReportForCity function 1016. Further, the Composition Root 1000 may include injecting the GenerateReportForCity function 1016 into a GenerateReport function 1018 resulting in a GenerateReport function 1020.

Figure 11:
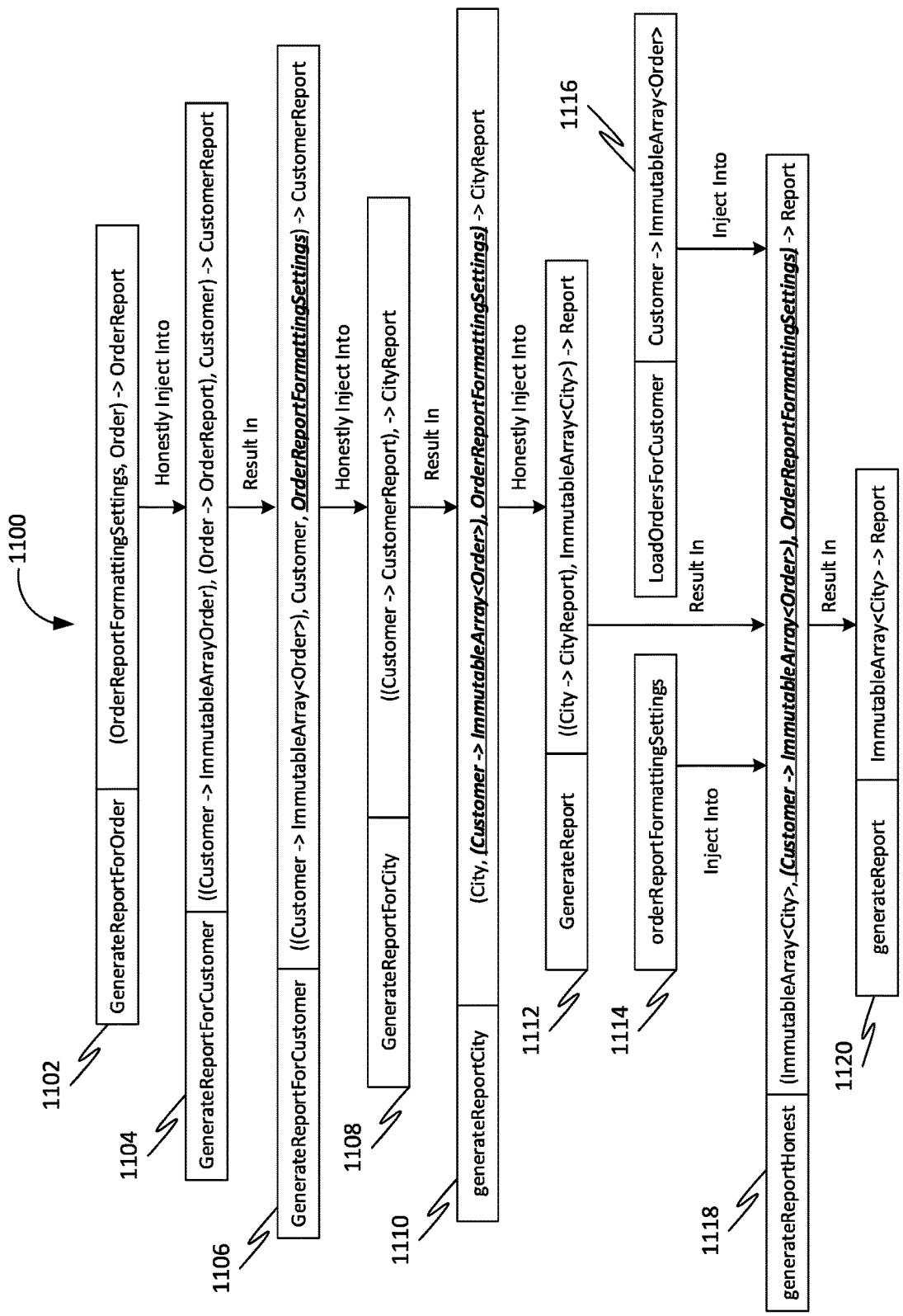
FIG. 11 is a flow diagram of a Composition Root (the Main method) using Flexible Dependency Injection (Honest Dependency Injection), in accordance with some embodiments.

FIG. 11 is a flow diagram of a Composition Root (the Main method) 1100 using Flexible Dependency Injection (Honest Dependency Injection), in accordance with some embodiments. Further, the Composition Root 1100 may include a HonestlyInject method to inject a first function of a plurality of functions into a second function of the plurality of functions.

Further, the HonestlyInject method may allow for injecting the first function into the second function, even if the first function may not exactly match the dependency required by the second function.

Further, the Composition Root 1100 may include honestly injecting a GenerateReportForOrder function 1102 into a GenerateReportForCustomer function 1104 resulting in a GenerateReportForCustomer function 1106. Further, the Composition Root 1100 may include honestly injecting the GenerateReportForCustomer function 1106 into a GenerateReportForCity function 1108 resulting in a GenerateReportCity function 1110. Further, the Composition Root 1100 may include honestly injecting the GenerateReportCity function 1110 into a GenerateReport function 1112 resulting in a GenerateReportHonest function 1118. Further, the Composition Root 1100 may include injecting an orderReportFormattingSettings object 1114 and a LoadOrdersForCustomer function 1116 into the GenerateReportHonest function 1118 resulting into a GenerateReport function 1120.

Further, a programming code written with the help of a Visual Studio 2017® extension may include:

A command line application may be implemented that generates reports based on some data in a database and then saves such a report to a file. The data may be related to customer orders. Each customer in the database may have orders. The report may be partitioned by the city in which the customers live. So, the structure of the report may look like the one shown in FIG. 5.

The Main method (the entry point of the application) may start by calling the LoadAllData method to obtain all the data needed to generate the report from the database, as shown in FIG. 6. The Main method then calls the GenerateReport method passing in the array of City objects obtained from LoadAllData. The City object may contain Customer objects representing all the customers living in the city. Each Customer object may contain Order objects representing the orders the customer may have made.

The GenerateReport method invokes the GenerateReportForCity method for each City object to generate a sub-report for each city and may aggregate all these sub-reports to generate the full report. The GenerateReport method may add other information to the report such as the total number of cities, the total number of customers, the total number of orders, etc.

The GenerateReportForCity method may perform something similar. For example, the GenerateReportForCity method may call GenerateReportForCustomer for each customer and then may aggregate the results into a CityReport object. The GenerateReportForCustomer method may perform a similar job. The GenerateReportForCustomer method may call GenerateReportForOrder for each Order object.

Further, GenerateReportForCity may sort the customer reports by customer name, while the GenerateReportForCustomer method may sort the order reports by date or total amount. Also, the additional data these methods add to the aggregated report, may be expected to be different.

The GenerateReportForOrder method returns an OrderReport object for the Order object the GenerateReportForOrder gets as input. The returned OrderReport may contain useful details about the order such as the products ordered, total price for each product, the order total price, etc.

Further, the Main method has a pure body but it calls other methods that are impure. Further, the LoadAllData and the SaveReport methods may be impure, and the other methods are pure, as shown in FIG. 6.

The LoadAllData method is impure because the LoadAllData method may communicate with the database. The SaveReport method is impure because the SaveReport method may write to the file system. The Main method is impure because the Main method invokes LoadAllData and SaveReport. The other methods simply contain pure logic.

Here may be the code for the Main method:

```
static void Main(string[ ] args) {
    var cities = LoadAllData( );
    var report = GenerateReport(cities);
    SaveReport(report); }
```

This is an example of an application that uses the concept of the impure/pure/impure sandwich.

First, the impure LoadAllData method is invoked to get all the data needed to generate the report. Then, the pure GenerateReport is invoked to generate the report. Then, the impure SaveReport method is invoked to save the report.

For practical reasons, loading all data from the database might be a problem if the data set is huge. One solution may be to not include the orders in the data loaded in the beginning and to load the orders for each customer when they are needed.

The LoadAllData method may be now renamed to LoadAllDataWithoutOrders as shown in FIG. 7. Also, the GenerateReportForCustomer method calls the impure LoadOrdersForCustomer method to get the Order objects for the customer from the database.

The bodies of the GenerateReport, GenerateReportForCity, and GenerateReportForCustomer methods are still pure. However, they are impure because they end up calling the LoadOrdersForCustomer method, which may be impure. Now, only the GenerateReportForOrder method is pure.

The GenerateReportForCustomer method may be made potentially-pure by making the GenerateReportForCustomer method invoke a getOrdersForCustomer function parameter (which is a new parameter added to this method) instead of invoking the impure LoadOrdersForCustomer method directly. Also, because a user may want to make GenerateReportForCity and GenerateReport potentially-pure, the user may make the GenerateReportForCity and the GenerateReport to take a getOrdersForCustomer parameter which GenerateReportForCity and GenerateReport may simply pass down.

The three Generate* methods are potentially-pure but not pure, as shown in FIG. 8. Further, potentially-pure methods may be honest about impurities of the potentially pure methods.

When calling the GenerateReport method, the Main method may pass the impure LoadOrdersForCustomer method as an argument for the getOrdersForCustomer parameter. In some sense, purity is brought back to the Generate* methods. Three Generate* methods have to pass getOrdersForCustomer down the call stack even if they don't use the getOrdersForCustomer parameter directly.

The sample application may be a simple one. A real application may have call stacks that may have 20 methods. Also, the number of parameters that intermediate methods may have to pass to the lower methods, may be large.

In an instance, consider that a user may want to control aspects of order report generation by using command line parameters. An OrderReportFormattingSettings class may be created to model such aspects. An instance of an OrderReportFormattingSettings class may be created and populated based on the command line arguments in the Main method, and then passed through the Generate* methods down to GenerateReportForOrder.

a OrderReportFormattingSettings parameter was added to the Generate* methods, as shown in FIG. 9. So, whenever a lower-level method requires a new parameter, either some settings related parameter, or some impure functionality, or some pure functionality that developers may want to vary from high level functions, all the methods need to be updated from the Main method down to this method so that they pass the new parameter/parameters. This may be a maintainability issue. The solution may be Dependency Injection.

Dependency Injection may fix some parameters at composition time and have some parameters be specified at runtime.

Here is a C# class that takes one parameter at composition time and one at runtime:

```
public sealed class SomeClass
{
public readonly int valueToAdd;
    public SomeClass(int valueToAdd)
{
  this.valueToAdd = valueToAdd;
}
    public int AddSome(int value) => value + valueToAdd;
}
```

When creating an instance of this class, the value for valueToAdd must be specified. Every time AddSome is invoked, a different value for the value parameter may be passed. However, valueToAdd is fixed because valueToAdd is set at composition time.

The four Generate* methods may be converted into classes and the present disclosure may describe the usage of Dependency Injection to have the orderReportFormattingSettings and getOrdersForCustomer parameters fixed at composition time, i.e., in the Main method.

Here is how the *Generator classes are composed and used in the Main method:
   var orderReportGenerator=new OrderReportGenerator(orderReportFormattingSettings);
   var customerReportGenerator=new CustomerReportGenerator(orderReportGenerator, LoadOrdersForCustomer);
   var cityReportGenerator=new CityReportGenerator(customerReportGenerator);
   var reportGenerator=new ReportGenerator(cityReportGenerator);
   var report=reportGenerator.Generate(cities);

The four *Generator objects are composed in the Main method. Only the OrderReportGenerator class has a dependency (via a constructor parameter) on orderReportFormattingSettings. Also, only the CustomerReportGenerator class has a dependency on LoadOrdersForCustomer.

Each *Generator object (except for orderReportGenerator) is given an instance of the lower-level *Generator class at composition time (via a constructor parameter).

Each of the *Generator classes has a single Generate method. Such Generate method is basically the result of converting the corresponding Generate* method described before.

If in the future, the OrderReportGenerator class requires more dependencies, all the classes that use the OrderReportGenerator class (directly or indirectly) do not need to be changed. The OrderReportGenerator class is the only one that needs to be changed and the present disclosure may describe the providing of the required dependency in the Composition Root (the Main method). This may be maintainable.

Based on the signature of the Generate method of the ReportGenerator class, the Generate method may only take in an array of cities. A user may not know from the Generate method signature alone that the Generate method will invoke the CityReportGenerator.Generate method.

By looking at the signature of the constructor of ReportGenerator, the user may know that the ReportGenerator class has a dependency on CityReportGenerator. Since both classes have a single method, the user may assume that the ReportGenerator.Generate method may have a dependency on the CityReportGenerator.Generate method. The user may not know that the getOrdersForCustomer parameter of CustomerReportGenerator's constructor will eventually be called by the ReportGenerator.Generate method. Because the *Generator classes depend on each other, the dependency tree may be navigated and the user may eventually know about getOrdersForCustomer (and also orderReportFormattingSettings). That is:
   1. From the signature of the constructor of ReportGenerator, the user may know about CityReportGenerator.
   2. From the signature of the constructor of CityReportGenerator, the user may know about CustomerReportGenerator.
   3. From the signature of the constructor of CustomerReportGenerator, the user may know about getOrdersForCustomer.
   4. From the signature of the constructor of CustomerReportGenerator, the user may know also about OrderReportGenerator.
   5. From the signature of the constructor of OrderReportGenerator, the user may know about orderReportFormattingSettings.

The above may be not as simple as looking into a single method's signature but may be doable.

Usually, to get the full benefits of Dependency Injection, the user may program to interfaces. In an instance, instead of having ReportGenerator depend on CityReportGenerator directly, the ReportGenerator may depend on ICityReportGenerator. This would be an interface implemented by CityReportGenerator. Usually, this may be done to enable the customization of the CityReportGenerator class without modifying it (the CityReportGenerator class). For example, the user may create a decorator for ICityReportGenerator, for instance, CityReportGeneratorLoggingDecorator, that logs to some file the fact that a specific city-level report is generated.

Now, the user may no longer be able navigate the concrete dependencies using the signature of the constructors. When the user looks at the constructor of the updated ReportGenerator class, for example, the user may see ICityReportGenerator, not CityReportGenerator. Here is how the constructor looks like:

```
public ReportGenerator(ICityReportGenerator cityReportGenerator)
{
    this.cityReportGenerator = cityReportGenerator;
}
```

The ReportGenerator class may not tell what concrete implementation may be behind ICityReportGenerator. This may be no longer the job of the ReportGenerator class. The Composition Root (the Main method) may be the one responsible for this.

The four *Generator objects may be composed in the Main method.
- var orderReportGenerator=new OrderReportGenerator(orderReportFormattingSettings);
- var customerReportGenerator=new CustomerReportGenerator(orderReportGenerator, LoadOrdersForCustomer);
- var cityReportGenerator=new CityReportGenerator(customerReportGenerator);
- var reportGenerator=new ReportGenerator(cityReportGenerator);
- var report=reportGenerator.Generate(cities);

The reportGenerator variable holds an instance of the ReportGenerator class.

Further, the user may navigate the constructor of ReportGenerator to find that ReportGenerator depends on ICityReportGenerator. Now, looking back at the Main method, the user may know that an instance of the CityReportGenerator class is used as ICityReportGenerator inside the ReportGenerator instance. The user may continue the same navigation process and use the code in the Main method to know which concrete implementation may be used behind which interface. Further, the user may get to know that reportGenerator.Generate eventually calls LoadOrdersForCustomer.

This navigation process is hard. That is, it may be hard for a software developer to know that reportGenerator.Generate eventually calls LoadOrdersForCustomer.

Partial invocation (partial application) is a functional programming technique that allows a software developer to invoke a function with only some of its parameters giving back another function, that takes the rest of the parameters as input.

In an instance, assume a user may have the following function, represented by a C# Func:

Func<int, int, int, int>calculate=(x,y,z)=>x*y+z;

This function takes three integers as parameters and returns another integer as a result based on the specified equation. Consider the following code:

Func<int, int, int>calculate1=(y,z)=>calculate(1,y,z)

This new function takes two integers as parameters and invokes the calculate function passing a constant value of 1 as the first argument, and then the values for y and z as the next two arguments.

Consider this code:
var calculate1=calculate(1);

In C#, this code may not compile. But in F# for example, a similar code may compile, and the result may be like how the user defined calculate1 the first time.

Consider the SomeClass class again:

```
public sealed class SomeClass
{
    public readonly int valueToAdd;
        public SomeClass(int valueToAdd)
        {
    this.valueToAdd = valueToAdd;
        }
        public int AddSome(int value) => value + valueToAdd;
}
```

This class may be replaced by the following function:

Func<int, int, int>AddSome=(valueToAdd, value)
    =>value+valueToAdd;

The user may call it directly like this:
var result=AddSome(2, 1);
But the user may also partially invoke it (in an imaginary version of C#) like this:
var AddSome2=AddSome(2);
And then may give AddSome2 to any consumer who needs to call SomeClass.AddSome.

This may be considered like constructing SomeClass such as:
var AddSome2=new SomeClass(2);

The difference may be that partial invocation (partial application) may be more flexible. Given a function, the user may choose which parameters to fix at composition time and which parameters the user needs to keep for the callers to specify at runtime.

The same function may be partially invoked (partially applied) in different ways, e.g. a different number of fixed parameters at composition time, and then the results may be given to different consumers.

Further, the present disclosure may be used to convert the *Generator classes back to functions and use partial invocation (partial application).

Further, consider a static class called ReportingModuleFunctions that contains public static methods that have the following signatures:

```
public static Report GenerateReport(
    Func<City, CityReport> generateCityReport,
    ImmutableArray<City> cities)
public static CityReport GenerateReportForCity(
    Func<Customer, CustomerReport> generateCustomerReport,
    City city)
public static CustomerReport GenerateReportForCustomer(
    Func<Customer, ImmutableArray<Order>>
        getOrdersForCustomer,
Func<Order, OrderReport> generateOrderReport,
    Customer customer)
public static OrderReport GenerateReportForOrder(
OrderReportFormattingSettings orderReportFormattingSettings,
    Order order)
```

The four Generate* methods do not call each other directly but call function parameters.

For example, the GenerateReport method does not call GenerateReportForCity directly, instead, the GenerateReport method takes a parameter of type Func<City, CityReport> that GenerateReport uses to generate the sub-report for each city. These four static methods may be considered the functional equivalent of the four classes described before (the ones that take interfaces as their dependencies).

The GenerateReport method takes a parameter of type Func<City, CityReport>, and the ReportGenerator class constructor takes a parameter of type ICityReportGenerator which has a single method that takes a City object and returns a CityReport object. Also, the GenerateReport method takes a parameter of type ImmutableArray<City>, and the Generate method in the ReportGenerator class takes a similar parameter.

Further, Dependency Injection may be used to connect classes together, Partial Invocation (partial application) may be used to connect the four functions together. The Main method may look like:

var generateReportForOrder=ReportingModule. GenerateReportForOrder( ) .PartiallyInvoke(orderReportFormattingSettings);
    var generateReportForCustomer=ReportingModule. GenerateReportForCustomer( ) .PartiallyInvoke(generateReportForOrder, DatabaseModule.LoadOrdersForCustomer( ));
    var generateReportForCity=ReportingModule. GenerateReportForCity( ) .PartiallyInvoke(generateReportForCustomer);
    var generateReport=ReportingModule.GenerateReport( ) .PartiallyInvoke(generateReportForCity);

The four Generate* methods are composed together.

A special method, the PartiallyInvoke method, is used to specify orderReportFormattingSetting for the GenerateReportForOrder function. The same is true for the other functions. Further, the PartiallyInvoke may be used to give a function to another function as a dependency.

C# does not have built-in support for partial invocation (partial application). In the above example, the PartiallyInvoke methods used in the Main method are auto generated extension methods. The code of the PartiallyInvoke method may be generated by a Visual Studio® extension, for example. Note that there might be many PartiallyInvoke overloads each generated for a specific case.

Also, the ReportingModule class is an auto generated class. The ReportingModule.GenerateReportForCity method is an auto generated method that returns a function (e.g. a Func) that will call the corresponding ReportingModuleFunctions.GenerateReportForCity method when it is invoked. This is done for convenience because, in C#, there may be no convenient way to convert a static method to a function. For example, if the user has a static method like this:

public static string FormatDate(DateTime date)

There may be no convenient way to obtain a Func<DateTime, string> from this method. For example, there may be no way to do something like this:

var formatDateFunc=FormatDate.ToFunc( );

Further, a developer may do this:

var formatDateFunc=new Func<DateTime, string>(FormatDate);

But this may be not convenient because the user has to specify the parameter types and the return type of the FormatDate method.

For example, consider that the user creates a static method of the following signature:

public static OrderReport GenerateReportForOrder(OrderReportFormattingSettings orderReportFormattingSettings, Order order)

Now, the generated ReportingModule.GenerateReportForOrder method is a function of type Func<(OrderReportFormattingSettings orderReportFormattingSettings, Order order), OrderReport> representing the static method.

Note that a tuple is used here to group all the inputs parameters. This is done here to make all functions use the Func<T, TResult> delegate. If a function has no inputs or no outputs, a special Unit type (e.g. class) may be used for T or TResult. Note that this is not the only way to represent functions. Different languages/tools/frameworks may model functions in different ways.

Let's look at another auto generated method, the HonestlyInject method. In this example, HonestlyInject is an extension method over Func.

Further, the present disclosure may use the HonestlyInject method in the Main method like this:

var generateReportForOrder=ReportingModule. GenerateReportForOrder( )
    var generateReportForCustomer=ReportingModule. GenerateReportForCustomer( ) .HonestlyInject(generateReportForOrder);
    var generateReportForCity=ReportingModule.GenerateReportForCity( ) .HonestlyInject(generateReportForCustomer);
    var generateReportHonest=ReportingModule. GenerateReport( ) .HonestlyInject(generateReportForCity);
    var generateReport=generateReportHonest .PartiallyInvoke(orderReportFormattingSettings, DatabaseModule.LoadOrdersForCustomer( ));
    var report=generateReport(cities);

The HonestlyInject method is different from the PartiallyInvoke method.

When using PartiallyInvoke, orderReportFormattingSettings was injected into ReportingModule.GenerateReportForOrder immediately. That is, before injecting generateReportForOrder into ReportingModule.GenerateReportForCustomer. With HonestlyInject, orderReportFormattingSettings is used at a later stage; Further, it is injected into generateReportHonest to get generateReport.

The same thing may be true for DatabaseModule.LoadOrdersForCustomer. When using PartiallyInvoke, the DatabaseModule.LoadOrdersForCustomer function is injected into ReportingModule.GenerateReportForCustomer immediately. While in the case of HonestlyInject, the DatabaseModule.LoadOrdersForCustomer is injected at a later stage into generateReportHonest to get generateReport.

The type of the generateReportHonest variable may be written as:

```
Func<
    (
    ImmutableArray< City>,
    Func<Customer, ImmutableArray<Order>>,
    OrderReportFormattingSettings
    ),
    Report>
``` generateReportHonest is a function that takes:
1. an array of cities.
2. a function that takes a customer and return an array of orders.
3. order report formatting settings.

Basically, the HonestlyInject method allows a user to inject one function, say function A, into another function, say function B, even if function A may not exactly match the dependency required by function B (the dependency here is a parameter of function B whose type is a function).

Consider the ReportingModule.GenerateReportForCustomer function. The ReportingModule.GenerateReportForCustomer function has the following signature:

```
Func<
    (
        Func<Customer, ImmutableArray<Order>> getOrdersForCustomer,
        Func<Order, OrderReport> generateOrderReport,
        Customer customer
    ),
    CustomerReport>
```

This function has a dependency of type Func<Order, OrderReport> which is a function that generates a sub-report for an order object. The user may want to inject generateReportForOrder for this dependency, but the generateReportForOrder function has the following signature:

```
Func<
    (
        OrderReportFormattingSettings orderReportFormattingSettings,
        Order order
    ),
    OrderReport>
```

It does not exactly match the dependency required by ReportingModule.GenerateReportForCustomer. When using Partial Invocation (partial application), the user first partially invoked (partially applied) GenerateReportForOrder with the orderReportFormattingSettings variable so that the signatures match.

The HonestlyInject method does not have such a requirement. The HonestlyInject method works even if the injected function has extra parameters. The HonestlyInject method may move such parameters to the resultant function. Therefore, if the user may look at the generateReportForCustomer variable, the user may see that the generateReportForCustomer variable has the following type:

```
Func<
    (
        Func<Customer, ImmutableArray<Order>>,
        Customer,
        OrderReportFormattingSettings
    ),
    CustomerReport>
```

The resultant function has an OrderReportFormattingSettings parameter. The same thing happened when the user injected generateReportForCustomer into ReportingModule.GenerateReportForCity. The Func<Customer, ImmutableArray<Order>> parameter of generateReportForCustomer moved to the result of the injection, that is, the function stored in the generateReportForCity variable. FIG. 10 and FIG. 11 may represent the Composition Roots (the Main methods) when using PartiallyInvoke and when using HonestlyInject:

The HonestlyInject method may allow the user to delay the injection of impure functions to the last possible moment. This may allow the user to keep composing pure/potentially-pure functions to the last possible moment.

The var keyword may be used to define all the intermediate function variables in the Main method. This may be required because if the user changes some low-level function to require some new dependency, the types of the variables holding the intermediate functions may change. If the user uses explicit types here, then the user may have the same maintenance issue the user had originally.

There may be many programming languages that treat functions as a first-class citizen and that may have the concept of partial invocation (partial application) built into the language. However, there may not be a language/framework that may have the concept of honest dependency injection or flexible dependency injection implemented into it.

When using Dependency Injection or Partial Invocation (Partial Application), the functions composed in the Composition Root may become impure very quickly. In some sense, this makes functions in the Composition Root, dishonest. To fix this, Honest Dependency Injection or Flexible Dependency Injection may be implemented. Using this technique, the user may inject pure/potentially-pure functions into each other without the need to inject impure dependencies first. This technique may allow the user to delay the injection of impure dependencies to the last possible moment.

Some conventional programming language may allow developers to create functions that take some input and produce some output (and optionally create a side effect). For example, in some conventional programming languages, the developers may create functions in C# such as:
    public static int AddOne(int x)=>x+1;
Further, the developers may also create a similar function in F# such as:
    let AddOne x=x+1
Further, the conventional programming language may allow developers to create a function that may also take other functions as parameters. Further, the function may be called a higher-order function. Further, in an instance, the developer may create the higher-order function in C# such as:

```
public static int AddOneAndLog(Action<string> log , int x)
{
    log("Adding one to " + x);
    return x + 1;
}
```

Further, in an instance, the developers may create the higher-order function in F# such as:
    let AddOneAndLog log x=log (sprintf "Adding one to % i" x) x+1
Further, the conventional programming language may allow developers to call a higher-order function passing as an argument another function. Further, in an instance, the developers may call the higher-order function in C# such as:
    var result=AddOneAndLog(Console.WriteLine, 2);
Further, in an instance, the developers may call the higher-order function in F# such as:
    let result=AddOneAndLog Console.WriteLine 2
Further, Console.WriteLine may be a function that takes a string, print the string to the console, and return nothing as output. The Console.WriteLine function matches the function parameter required by AddOneAndLog.

Further, the conventional programming language may allow developers to partially invoke a function, passing only some of its parameters. Further, in an instance, the developers may partially invoke a function in F# such as:

let AddOneAndLogToConsole=AddOneAndLog Console.WriteLine

Here, AddOneAndLog is partially invoked (partially applied) giving it only a value for a first parameter. In the given instance, for the parameter named "log", the developer has passed an argument which is Console.WriteLine.

Now, AddOneAndLogToConsole is a new function that takes only an integer parameter x, and returns an integer. Now, the new function already has the value for the log parameter baked inside (Console.WriteLine).

Further, the developers may invoke the new function such as:
let result=AddOneAndLogToConsole 2

Further, the code above may have the same effect as calling:
let result=AddOneAndLog Console.WriteLine 2

Further, in an instance, the below given F# code may be considered:
let LogToServer (message: string) (address: string)= ( ) //This is a dummy example. Real code might connect to some server using the address parameter and use it to log the message
let AddOneAndLogToServer=AddOneAndLog LogToServer Further, this code may not compile in F# (also similar code will not compile in other conventional programming languages). Further, the reason is that the AddOneAndLog function's log parameter is of a type string→unit (a function that takes a string and returns nothing), while the passed argument is a function that has the following signature: string→string→unit (a function that takes two strings and returns nothing).

The present disclosure enables this code to work by providing a convenient way to move the extra parameter to the resultant function. That is, the resultant AddOneAndLogToServer function will be of type:
(address: string)→(x: int)→int According to some embodiments, a code generation service may be provided via a remote server (such as the server 102). The software developer may write composition code in the Main method (e.g. code that calls the HonestlyInject method). Now, instead of having code generation performed offline, the extension (such as the extension to an IDE, e.g. Visual Studio®) may send the code in the Main method to a special server and this server will generate the appropriate code and send the result back to the client.

According to alternate embodiments, software developer writes via an IDE installed on a local computer. The processor of the local computer analyzes the code written by the software developer and detects that it needs to generate some code based on the code written by the software developer. Then, the processor generates the new code and includes it as part of the program that the software developer is working on. The processor may generate the new code based on computer instructions received from an extension to the IDE (such as the extension to an IDE, e.g. Visual Studio®).

Microsoft® may allow users to extend Visual Studio® to add new features.

Visual Studio® is a program created by Microsoft® that may allow software developers to write and maintain software. Further, according to some embodiments, a Visual Studio 2017® extension may be a product which may help software developers to write code in Visual Studio 2017®.

Further, according to an exemplary embodiment, the code, as shown in FIG. 12, may be written in Visual Studio 2017® using a Visual Studio 2017® extension.

Further, according to some embodiments, a call to a HonestlyInject method may be the main thing that may be noted from the code, as shown in FIG. 12. The HonestlyInject method may allow the injection of LogToServer into AddOneAndLog (as a value of the log parameter) even if the signatures may not match. Further, the signature of LogToServer may not match the signature of the function represented by the log parameter.

Further, according to some embodiments, the HonestlyInject method may be auto generated by the Visual Studio 2017® extension. Further, according to some embodiments, the below given code may be the generated code.

```
public static class HonestlyInjectWithNamedArgumentsExtensionMethods1
{
    [HonestlyInjectMap(0)]
    public static
IFunction<(Tagged<string,Module1Parameters.LogToServer.address>,
Tagged<int, Module1Parameters.AddOneAndLog.x>), int> HonestlyInject(
        this IFunction<(Tagged<IFunction<Tagged<string,
Module1Parameters.AddOneAndLog.log.obj>, Unit>,
    Module1Parameters.AddOneAndLog.log>, Tagged<int,
Module1Parameters.AddOneAndLog.x>), int>
f1,[NameIsParameterName(typeof(Module1Parameters.AddOneAndLog.log))]
        IFunction<(Tagged<string, Module1Parameters.LogToServer.message>,
Tagged<string, Module1Parameters.LogToServer.address>), Unit> log)
        {
            return new HonestlyInjectClass(f1, log);
        }
        private sealed class HonestlyInjectClass : IFunction<(Tagged<string,
Module1Parameters.LogToServer.address>, Tagged<int,
Module1Parameters.AddOneAndLog.x>), int>
        {
            private readonly IFunction<(Tagged<IFunction<Tagged<string,
Module1Parameters.AddOneAndLog.log.obj>, Unit>,
Module1Parameters.AddOneAndLog.log>,
                Tagged<int, Module1Parameters.AddOneAndLog.x>), int> f1;
            private readonly IFunction<(Tagged<string,
Module1Parameters.LogToServer.message>, Tagged<string,
Module1Parameters.LogToServer.address>), Unit> f2;
            public HonestlyInjectClass(
                IFunction<(Tagged<IFunction<Tagged<string,
Module1Parameters.AddOneAndLog.log.obj>, Unit>,
```

```
Module1Parameters.AddOneAndLog.log>, Tagged<int,
Module1Parameters.AddOneAndLog.x>), int> f1,
                IFunction<(Tagged<string,
Module1Parameters.LogToServer.message>, Tagged<string,
Module1Parameters.LogToServer.address>), Unit> f2)
            {
                    this.f1 = f1;
                    this.f2 = f2;
            }
        public int
Invoke((Tagged<string,Module1Parameters.LogToServer.address>,
    Tagged<int, Module1Parameters.AddOneAndLog.x>) input)
            {
                    return f1.Invoke((new Tagged<IFunction<Tagged<string,
Module1Parameters.AddOneAndLog.log.obj>, Unit>,
Module1Parameters.AddOneAndLog.log>(new FuncImpl(f2, input.Item1)),
input.Item2));
            }
            private sealed class FuncImpl : IFunction<Tagged<string,
Module1Parameters.AddOneAndLog.log.obj>, Unit>
            {
                    private readonly IFunction<(Tagged<string,
Module1Parameters.LogToServer.message>, Tagged<string,
Module1Parameters.LogToServer.address>), Unit> f2;
                    private readonly Tagged<string,
Module1Parameters.LogToServer.address> newInput1;
                    public FuncImpl(IFunction<(Tagged<string,
Module1Parameters.LogToServer.message>, Tagged<string,
Module1Parameters.LogToServer.address>), Unit> f2,
                    Tagged<string, Module1Parameters.LogToServer.address>
newInput1)
                    {
                        this.f2 = f2;
                        this.newInput1 = newInput1;
                    }
                    public Unit Invoke(Tagged<string,
Module1Parameters.AddOneAndLog.log.obj> input)
                    {
                            return f2.Invoke((new Tagged<string,
Module1Parameters.LogToServer.message>(input.Value), newInput1));
                    }
            }
        }
        [OriginalClassTypeAttribute(typeof(Module1Functions))]
        public static class Module1
        {
            public static IFunction<(Tagged<IFunction<Tagged<string,
Module1Parameters.AddOneAndLog.log.obj>, Unit>,
Module1Parameters.AddOneAndLog.log> log, Tagged<int,
Module1Parameters.AddOneAndLog.x>
                x), int> AddOneAndLog( )
            {
                return new AddOneAndLogToFunctionClass( );
            }
            public static IFunction<(Tagged<string,
Module1Parameters.LogToServer.message> message, Tagged<string,
Module1Parameters.LogToServer.address> address), Unit> LogToServer( )
            {
                return new LogToServerToFunctionClass( );
            }
            private class AddOneAndLogToFunctionClass :
IFunction<(Tagged<IFunction<Tagged<string,
Module1Parameters.AddOneAndLog.log.obj>, Unit>,
Module1Parameters.AddOneAndLog.log> log,
                Tagged<int, Module1Parameters.AddOneAndLog.x> x), int>
            {
                public int Invoke(
                        (Tagged<IFunction<Tagged<string,
Module1Parameters.AddOneAndLog.log.obj>, Unit>,
Module1Parameters.AddOneAndLog.log> log, Tagged<int,
Module1Parameters.AddOneAndLog.x> x) input)
                {
                        return Module1Functions.AddOneAndLog(lp1 =>
input.log.Value.Invoke(new Tagged<string,
Module1Parameters.AddOneAndLog.log.obj>(lp1)), input.x.Value);
                }
            }
            private class LogToServerToFunctionClass : IFunction<(Tagged<string,
```

```
Module1Parameters.LogToServer.message> message, Tagged<string,
Module1Parameters.LogToServer.address> address), Unit>
        {
            public Unit Invoke((Tagged<string,
Module1Parameters.LogToServer.message> message, Tagged<string,
Module1Parameters.LogToServer.address> address) input)
            {
                Module1Functions.LogToServer(input.message.Value,
input.address.Value);
                return Unit.Instance;
            }
        }
    }
    [OriginalClassTypeAttribute(typeof(Module1Functions))]
    public static class Module1Parameters
    {
        public static class AddOneAndLog
        {
            [ParameterNameAttribute]
            public class log
            {
                [ParameterNameAttribute]
                public class obj
                {
                }
            }
            [ParameterNameAttribute]
            public class x
            {
            }
        }
        public static class LogToServer
        {
            [ParameterNameAttribute]
            public class message
            {
            }
            [ParameterNameAttribute]
            public class address
            {
            }
        }
    }
}
```

Note: in the above code, a special interface called IFunction is used to model a function. This is similar to the Func delegate I talked about. Different embodiments may model functions in different ways. Some embodiments may use classes to model or represent functions.

Further, according to some embodiments, the generated code may be different each time. Further, whenever the software developers may write "HonestlyInject", a special overload of the HonestlyInject method (or other methods) may be created based on the signatures of the involved functions.

Further, according to some embodiments, the HonestlyInject method may be implemented through a Visual Studio 2017® extension. Further, the HonestlyInject method may be integrated into a programming language itself.

Further, the Visual Studio 2017® extension may be configured to an online platform 100. Further, a user 112 may access the online platform 100 to download the Visual Studio 2017® extension.

Further, in some embodiment, the compiler (or another optimization tool) might optimize the generated code so that the runtime performance of the code is optimized. For example, the compiler might decide to generate special code for multiple related Flexible/Honest Dependency Injection method invocations (e.g. invocation to HonestlyInject or HonestlyReplace. etc) so that the performance of the generated code is better. One potential performance optimization may be to optimize the amount of memory allocation required at runtime. Another potential performance optimization may be to minimize the number of methods in the call stack.

Further, according to some embodiments, the Flexible Dependency Injection method (also called Honest Dependency Injection method) may enable lower-level functions to access parameters of higher-level functions. For example, say that Function1 may call Function2 which may call Function3 which may call Function 4 and so on until Function20 is called. Say that Function2 may have a parameter say param1 which may be not relevant to Function 3 and therefore may not be passed to Function3. Further, if Function20 may require access to param1, then Function2 may pass param1 to Function3 which in turn may pass param1 to Function4 which may pass param1 to Function5, etc. until param1 reaches Function19 and then Function20. If Honest/Flexible Dependency Injection is used, then Function20 may specify that Function20 requires the parameter (param1) by having param1 as a parameter in the definition of Function20, and then all the upward functions will automatically have this extra parameter once the upward functions are composed together using the Honest/Flexible Dependency Injection approach. Now, the composed version of Function2 will have two copies of the param1 parameter (one is defined originally by Function2, and the second is propagated automatically by the invented language/tool feature because the second was defined in Function20). The two parameters may be merged easily into a single parameter through another language/tool feature. For example, in some embodiment, a JoinInputs method may be auto generated to enable a software developer to create a new function that contains only a single copy of a parameter from a function that has more than one copy of the parameter. Such new function simply passes the same value to the merged parameters.

Further, according to some embodiments, the Honest/Flexible Dependency Injection method may enable the propagation of some new output of low-level functions to high-level functions. Consider the example above. Function20 may want to generate some new output. Further, without the help of the Honest/Flexible Dependency Injection method, if the new output needs to be propagated to Function2, all intermediate functions may need to propagate the output manually. For example, Function19 may take the output from Function20 and may give the output to Function18, then Function18 may give the output to Function17, etc. Further, using the Honest/Flexible Dependency Injection method, Function20's new output may be converted to become an indirect output parameter (that may be output in the form of a function parameter that is invoked by the function to give the output to the caller). For example, in C#, instead of including the new output as part of the return type, a new outputParam1 parameter may be added which is of type Action<SomeOutput>. Further, with the Honest/Flexible Dependency Injection method the outputParam1 may be propagated to the high-level function, i.e., Function2, automatically. Further, additional language/tool features may easily allow the conversion of output from direct to indirect and vice versa.

Note: the word "method" might mean an operator. E.g. the HonestlyInject method means the HonestlyInject operator.

Another way to enable the propagation of output of lower-level functions in higher-level function:

Similar to the HonestlyInject method (or operator), a new method, say HonestlyInject2, may be designed to enable the injection of a function, say function1, into another function, say function2, even if function1 has extra output values than the dependency required by function2.

For example, in C#, a dependency required by function2 may have the following signature:

Func<Input1, (Output1, Output2)>

And the signature of function1 is:

Func<(Input1, Input2), (Output1, Output2, Output3)>

In this case, the use of HonestlyInject2 will produce a function that has an extra input (Input2), and an extra output value. This extra output value may be of type Output3[ ] (an array of Output3). This may be the case because function2 might call the dependency multiple times and therefore collect multiple values of Output3. In some embodiments, a software developer may mark the dependency in some way (e.g. via applying an attribute on the dependency function parameter, or via using a special delegate type, etc.) to signify that the dependency function will be called exactly once or at most once by function2. In this case, the extra output of the function produced by HonestlyInject2 may be of type Output3 or "Output3?" respectively where "Output3?" means an optional value of Output3.

This means that when Honestly/Flexibly injecting lower-level functions into higher-level functions, any extra output value/values will be propagated to the composed higher-level functions.

Note: the composed higher-level functions are the functions that result from composing other functions. In some embodiments, these are function variables in the Composition Root (e.g. Main method).

Note: The Composition Root may be the Main method but other places in the application might be considered to be the Composition Root. A software developer might compose functions also in places that are not considered to be Composition Roots.

Another possible variation of HonestlyInject, say HonestlyInject3, will enable the injection of a function, say function1, in another function, say function2, even if function1 does not have all the inputs that the dependency of function2 has.

For example, in C#, a dependency required by function2 may have the following signature:

Func<(Input1, Input2), Output1>

And the signature of function1 is:

Func<(Input1, Input3), (Output1, Output2)>

In this case, the function produced by HonestlyInject3 will contain an extra input (Input3), and an extra output (E.g. Output2[ ]). The significant thing here is that HonestlyInject3 works even if function1 does not have an input parameter of type Input2. In some embodiment, the IDE (Integrated Development Environment) may issue a warning here. In some embodiment, the function produced by HonestlyInject3 may contain an extra output value of type Input2[ ] (or Input2, or "Input2?"). Such output may be obtained by keeping track of the values of Input2 that function2 passed to the dependency. In some embodiment, the function produced by HonestlyInject3 may contain an indirect output parameter instead of direct output. That is, in the example just discussed, the resultant function may have an extra parameter of type Action<Input2[ ]> that is invoked once by the function produced by HonestlyInject3. In some embodiment, the extra parameter type will be Action<Input2> and will be called each time the dependency function is called.

In some embodiment, the HonestlyInject method may allow the injection of a function, say function1 into another function, say function2, even if the dependency in function2 has inputs of types that are different than the inputs of function1. This may be possible if the inputs of the dependency has types that are implicitly convertible to the types of inputs in function1. For example, a function with the following signature:

Func<long, string>

May be be injected when the dependency has the following signature:

Func<int,string>

Because int is implicitly convertible to long in C#.

In some embodiment, the language/framework/tool may provide a way (e.g. method or operator) to aggregate indirect output. For example, an AggregateIndirectOutput method may be auto generated to enable the aggregation of a single or multiple indirect output parameters into a single indirect output parameter. For example, the function with the following C# signature:

Func<Action<Output1>, int> can be converted to a function with the following signature

Func<Action<Output1[ ]>, int>

Here is some excerpt of sample code related to how the software developer may use an AggregateIndirectOutput method to do this:

```
    Func<Action<Output1>, int> function1 = ...// Definition of function
here
    Func<Action<Output1[ ]>, int> function2 =
function1.AggregateIndirectOutput( );
```

In this case, the generated AggregateIndirectOutput method works by storing all values of Output1 and then finally outputting the list of Output1 objects after invocation completes (via the indirect output parameter).

AggregateIndirectOutput may aggregate multiple outputs like this:

```
    Func<(Action<Output1>, Action<Output2>), int> function1 =
...//Definition of function here
    Func<Action<NewAggregatedOutput>, int> function2 = function1.
AggregateIndirectOutput((arrayOfOutput1, arrayOfOutput2) => new
NewAggregatedOutput(arrayOfOutput1, arrayOfOutput2));
```

In this example, the software developer provided a lambda expression to tell the AggregateIndirectOutput method how to generate a single NewAggregatedOutput object from the list of Output1 objects and the list of Output2 objects. The aggregated value (of type NewAggregatedOutput) will be given as indirect output at the end of invocation.

In some embodiment, aggregation of indirect outputs may be done via observables. An observable in the context of Reactive Extensions may be an object that emits items (e.g. data) that an observer may receive if it subscribes to the observable. When the software developer wants to specify how to aggregate different indirect outputs, she may pass a lambda to explain how to generate a new observable given some observables that correspond to the indirect outputs that she wishes to aggregate. The final result may be similar to how aggregation works without observables. Observables may be used only to specify how to aggregate, not necessarily how the end result looks like.

In some embodiment, a HonestlyReplace method may be provided as a way for software developers to change a single parameter of a function, say param1, by providing another function whose return type matches (or may be converted to) the type of param1.

For example, consider this C# code:

```
    Func<(int, uint), string> function1 = ...//Definition of function here
    Func<(float,double), int> function2 = ...//Definition of function here
    Func<(float,double,uint), string> function3 =
function1.HonestlyReplace<int>(function2);
```

When function3 is invoked, it internally invokes function2 passing the float and double parameters to obtain the int which is the output of function2. Then function1 will be invoked passing the int just obtained and the uint originally passed to function3.

In some embodiment, parameter names may be used to select which parameter to process in any of the methods described before. For example, when using HonestlyReplace, a software developer may specify the parameter she wants to replace using its name. This means that the underlying programming language, framework, and/or tool needs to have certain level of support for named parameters for functions in their different forms.

The following example is written in a language that may be C# in an updated form:

```
    Func<(int param1, uint param2), string> function1 = ...//Definition
of function here
    Func<(float param3,double param4), int> function2 = ...//Definition
of function here
    Func<(float param3,double param4,uint param2), string> function3 =
function1.HonestlyReplace (param1: function2);
```

In this example, param1 is used to tell HonestlyReplace to replace the parameter named param1 in function1.

In some embodiments that support programming languages which do not have a certain level of support for named parameters, extra code may be generated to create types for the purpose of including and preserving the name of the parameters when functions get modified/updated as a result of doing Honest/Flexible dependency injection.

For example, for this C# function:
public static int DoSomething(int param1)=>param1+1;
A class called param1 (put in a special namespace) may be generated.

Then the software developer will be provided (via code generation) access to a function of type:
Func<NamedParameter<int,param1>, int>

NamedParameter may be a special class (that may be generated or provided via a library) that enables the preservation of parameter names even after parameters get modified and/or moved from one function to another. This NamedParameter type may have a different name. In one of the examples disclosed in this application, the name of this type was "Tagged".

Methods of Honest/Flexible dependency injection such as HonestlyInject may be designed to understand the NamedParameter class. For example, when generating overloads of the HonestlyInject extension method, the parameter that is designed to receive the function to be injected (into the dependency) will have the name of the dependency parameter. This enables the code that composes functions together to use named parameters to specify which dependency to use for injection.

To further support named parameters, special methods/operators may be designed to enable a software developer to rename a parameter after composition. For example,
Func<NamedParameter<int,param1>, int> function1= . . . //Define function here
var function2=function1.RenameParameter (param1_param2:0);

The auto generated RenameParameter method will produce a function that has the following type:
Func<NamedParameter<int,param2>, int>

Where param2 is an auto generated class to represent the new parameter name.

When using named parameters, some embodiments may decide how to match the inputs of the dependency with the inputs of the injected function (the function given as a value for the dependency) in many ways. For example, one embodiment may decide that two inputs are matched together if they have the same name. Another embodiment may decide that two inputs are matched together if they have the same name and the same type or they have types that have an implicit conversion in the right direction.

Other embodiments may support named parameters in different ways.

In some embodiments, the IDE is augmented with visual tools that makes the experience of working on Flexible/Honest dependency injection an easy one.

In some embodiments, a HonestlyInjectOne method that is similar to HonestlyInject may be provided to support dependencies whose types are an array (or any type of collection) of functions instead of a function. For example, given the following functions:

```
Func<Func<string, float>[ ],int> function1 = ...// Definition of function here
Func<(string, long), float> function2 = ...// Definition of function here
```

Further, the present disclosure may be used to inject function2 into function1 like this:
    var resultantFunction1=function1.HonestlyInjectOne(function2);
    resultantFunction1 in this case may be of type Func<long, Func<string, float>[ ],int>.

This allows a software developer to honestly/flexibly inject function2 as one element of the array of functions which are the dependency required by function1. This means that a software developer may use HonestlyInjectOne multiple times to inject multiple functions into the dependency of function1.

For example, continuing the previous example:

```
Func<(string, ulong), float> function3 = ...// Definition of function here
var resultantFunction2 = resultantFunction1.HonestlyInjectOne(function3);
```

In this case, resultantFunction2 may be of type Func<(long, ulong, Func<string, float>[ ]), int>

Also, a HonestlyInjectLast method may be provided to support the injection of the last function when the dependency is an array (or any type of collection) of functions. Continuing the previous example, the following code may be used to inject the last function in the array:

```
Func<(string, double), float> function4 = ...// Definition of function here
var resultantFunction3 = resultantFunction2.HonestlyInjectLast(function4);
```

In this case, resultantFunction3 may be of type Func<(long, ulong, double),int>.

In some embodiments, HonestlyInjectOne and HonestlyInjectLast may work even if the type of the dependency is a function instead of an array of functions. In this case, there may be a way to invoke the multiple provided functions when the single dependency function is invoked. In case the dependency function does not have any outputs, it may be easy to invoke multiple injected functions. In case the dependency function has outputs, there may be a way to aggregate these outputs.

The methods explained before, e.g. HonestlyInject, may have different names in different embodiments. In some embodiments, they may be operators or any other kind of programming language/tool/framework feature. Other embodiments may provide similar results of these methods in different ways.

Further, according to some embodiments, the Honest Dependency Injection method may ultimately help software developers to use the Honest Dependency Injection method in writing or maintaining software programs.

Computer programs are composed of my pieces called functions. The present disclosure allows functions to pass inputs and/or outputs between each other in an easy and clear way. These inputs/outputs might be data or they may be functions. The present disclosure may make computer programs more easy to write and maintain.

Further, the Honest Dependency Injection method may allow programming languages and tools developers to enhance the languages and the tools that they may maintain.

Although the present disclosure has been explained in relation to its preferred embodiment, it is to be understood that many other possible modifications and variations can be made without departing from the spirit and scope of the disclosure.

The following is claimed:

1. A method for generating code to enable a honest/flexible functional dependency injection approach, the method comprising:
    receiving, using a communication device, a composition code from a user device, wherein the composition code contains a usage of a composition operator, wherein the composition operator is associated with at least two functions, wherein a first function of the at least two functions comprises a dependency parameter, wherein the dependency parameter comprises a function parameter or a non-function parameter, wherein the dependency parameter is selected implicitly or explicitly in the composition code, wherein a second function of the at least two functions provides a value for the dependency parameter, wherein the second function is not used as a direct value for the dependency parameter, wherein the second function of the at least two functions comprises at least one incompatibility in relation to the dependency parameter of the first function based on the dependency parameter comprising the function parameter, wherein the second function of the at least two functions comprises an output and the output provides a value for the dependency parameter based on the dependency parameter comprising the non-function parameter;
    analyzing, using a processing device, the composition code;
    generating, using the processing device, a new code based on the analyzing, wherein the new code enables the composition operator for injecting the second function or the output of the second function as a value for the dependency parameter in the first function, wherein the injecting provides a resulting function, wherein the resulting function is a modified version of the first function, wherein the modified version of the first function does not comprise the dependency parameter, wherein the resulting function comprises at least one of at least one additional input parameter, at least one additional output, and at least one additional indirect output parameter based on the dependency parameter and the at least one incompatibility; and
    transmitting, using the communication device, the new code to the user device.

2. The method of claim 1, wherein the second function comprises a plurality of second functions, wherein the dependency parameter of the first function comprises a plurality of dependencies, wherein the new code enables the composition operator for injecting the plurality of second functions or outputs of the plurality of second functions as values of the plurality of dependencies in the first function.

3. The method of claim 1, wherein the dependency parameter comprises the function parameter, wherein the at least one incompatibility comprises at least one of at least one extra input parameter in relation to the dependency parameter of the first function, at least one missing input parameter in relation to the dependency parameter of the first function, and at least one extra output in relation to the dependency parameter of the first function, wherein the second function comprises the at least one of the at least one extra input parameter, the at least one missing input parameter, and the at least one extra output.

4. The method of claim 1, wherein the dependency parameter comprises the non-function parameter, wherein the new code enables the composition operator to provide a resultant function based on a usage of the output of the second function as the value for the dependency parameter, wherein the resultant function is a modified version of the first function, wherein the modified version of the first function does not comprise the dependency parameter, wherein the modified version comprises all inputs of the second function, wherein the resultant function is configured for calling the second function to obtain the output of the second function, wherein the resultant function is configured for passing the output as a value for the dependency parameter of the first function to the first function.

5. The method of claim 3 further comprising matching, using the processing device, at least one input of the dependency parameter with at least one input of the second function based on an implicit conversion of at least one of the at least one input of the dependency parameter and the at least one input of the second function in a right direction.

6. The method of claim 3 further comprising matching, using the processing device, at least one output of the dependency parameter with at least one output of the second function based on an implicit conversion of at least one of the at least one output of the dependency parameter and the at least one output of the second function in a right direction.

7. The method of claim 1, wherein at least one parameter of the at least two functions comprises at least one name, wherein the at least one name is preserved during the generation of the resulting function.

8. The method of claim 1, wherein a validity of a usage of at least one operator associated with the composition code is determined at run time.

9. A system for generating code to enable a honest/flexible functional dependency injection approach, the system comprising:
a communication device configured for:
receiving a composition code from a user device, wherein the composition code contains a usage of a composition operator, wherein the composition operator is associated with at least two functions, wherein a first function of the at least two functions comprises a dependency parameter, wherein the dependency parameter comprises a function parameter or a non-function parameter, wherein the dependency parameter is selected implicitly or explicitly in the composition code, wherein a second function of the at least two functions provides a value for the dependency parameter, wherein the second function is not used as a direct value for the dependency parameter, wherein the second function of the at least two functions comprises at least one incompatibility in relation to the dependency parameter of the first function based on the dependency parameter comprising the function parameter, wherein the second function of the at least two functions comprises an output and the output provides a value for the dependency parameter based on the dependency parameter comprising the non-function parameter; and
transmitting a new code to the user device; and
a processing device communicatively coupled with the communication device, wherein the processing device is configured for:
analyzing the composition code; and
generating the new code based on the analyzing, wherein the new code enables the composition operator for injecting the second function or the output of the second function as a value for the dependency parameter in the first function, wherein the injecting provides a resulting function, wherein the resulting function is a modified version of the first function, wherein the modified version of the first function does not comprise the dependency parameter, wherein the resulting function comprises at least one of at least one additional input parameter, at least one additional output, and at least one additional indirect output parameter based on the dependency parameter and the at least one incompatibility.

10. The system of claim 9, wherein the second function comprises a plurality of second functions, wherein the dependency parameter of the first function comprises a plurality of dependencies, wherein the new code enables the composition operator for injecting the plurality of second functions or outputs of the plurality of second functions as values of the plurality of dependencies in the first function.

11. The system of claim 9, wherein the dependency parameter comprises the function parameter, wherein the at least one incompatibility comprises at least one of at least one extra input parameter in relation to the dependency parameter of the first function, at least one missing input parameter in relation to the dependency parameter of the first function, and at least one extra output in relation to the dependency parameter of the first function, wherein the second function comprises the at least one of the at least one extra input parameter, the at least one missing input parameter, and the at least one extra output.

12. The system of claim 9, wherein the dependency parameter comprises the non-function parameter, wherein the new code enables the composition operator to provide a resultant function based on a usage of the output of the second function as the value for the dependency parameter, wherein the resultant function is a modified version of the first function, wherein the modified version of the first function does not comprise the dependency parameter, wherein the modified version comprises all inputs of the second function, wherein the resultant function is configured for calling the second function to obtain the output of the second function, wherein the resultant function is configured for passing the output as a value for the dependency parameter of the first function to the first function.

13. The system of claim 11, wherein the processing device is further configured for matching at least one input of the dependency parameter with at least one input of the second function based on an implicit conversion of at least one of the at least one input of the dependency parameter and the at least one input of the second function in a right direction.

14. The system of claim 11, wherein the processing device is further configured for matching at least one output of the dependency parameter with at least one output of the second function based on an implicit conversion of at least one of the at least one output of the dependency parameter and the at least one output of the second function in a right direction.

15. The system of claim 9, wherein at least one parameter of the at least two functions comprises at least one name, wherein the at least one name is preserved during the generation of the resulting function.

16. The system of claim 9, wherein a validity of a usage of at least one operator associated with the composition code is determined at run time.

17. A non-transitory computer-readable medium comprising computer-executable instructions which when executed on a processing device performs a method for generating code to enable a honest/flexible functional dependency injection approach, the method comprising:
receiving, using the processing device, a composition code, wherein the composition code contains a usage of a composition operator, wherein the composition operator is associated with at least two functions, wherein a first function of the at least two functions comprises a dependency parameter, wherein the dependency parameter comprises a function parameter or a non-function parameter, wherein the dependency parameter is selected implicitly or explicitly in the composition code, wherein a second function of the at least two functions provides a value for the dependency parameter, wherein the second function is not used as a direct value for the dependency parameter, wherein the second function of the at least two functions comprises at least one incompatibility in relation to the dependency parameter of the first function based on the dependency parameter comprising the function parameter, wherein the second function of the at least two functions comprises an output and the output provides a value for the dependency parameter based on the dependency parameter comprising the non-function parameter;
analyzing, using the processing device, the composition code;
generating, using the processing device, a new code based on the analyzing, wherein the new code enables the composition operator for injecting the second function or the output of the second function as a value for the dependency parameter in the first function, wherein the injecting provides a resulting function, wherein the resulting function is a modified version of the first function, wherein the modified version of the first function does not comprise the dependency parameter, wherein the resulting function comprises at least one of at least one additional input parameter, at least one additional output, and at least one additional indirect output parameter based on the dependency parameter and the at least one incompatibility; and
storing, using a storage device, the new code.

18. The non-transitory computer-readable medium of claim 17, wherein the second function comprises a plurality of second functions, wherein the dependency parameter of the first function comprises a plurality of dependencies, wherein the new code enables the composition operator for injecting the plurality of second functions or outputs of the plurality of second functions as values of the plurality of dependencies in the first function.

19. The non-transitory computer-readable medium of claim 17, wherein the dependency parameter comprises the function parameter, wherein the at least one incompatibility comprises at least one of at least one extra input parameter in relation to the dependency parameter of the first function, at least one missing input parameter in relation to the dependency parameter of the first function, and at least one extra output in relation to the dependency parameter of the first function, wherein the second function comprises the at least one of the at least one extra input parameter, the at least one missing input parameter, and the at least one extra output.

20. The non-transitory computer-readable medium of claim 19, wherein the dependency parameter of the first function represents a plurality of functions, wherein the new code enables the composition operator for injecting the second function as a value for the dependency parameter, wherein the injecting of the second function as the value for the dependency parameter causes the resulting function to contain the dependency parameter, wherein a resulting dependency parameter represents a plurality of functions.

21. The non-transitory computer-readable medium of claim 19, wherein the dependency parameter of the first function represents a plurality of functions, wherein the new code enables the composition operator for injecting the second function as an only value in the dependency parameter.

22. The non-transitory computer-readable medium of claim 17, wherein the dependency parameter comprises the non-function parameter, wherein the new code enables the composition operator to provide a resultant function based on a usage of the output of the second function as the value for the dependency parameter, wherein the resultant function is a modified version of the first function, wherein the modified version of the first function does not comprise the dependency parameter, wherein the modified version comprises all inputs of the second function, wherein the resultant function is configured for calling the second function to obtain the output of the second function, wherein the resultant function is configured for passing the output as a value for the dependency parameter of the first function to the first function.

23. The non-transitory computer-readable medium of claim 17, wherein the new code is associated with a first programming language and the composition code is associated with a second programming language, wherein the first programming language and the second programming language are dissimilar.

24. The non-transitory computer-readable medium of claim 17, wherein the new code is associated with a first programming language and the composition code is associated with a second programming language, wherein the first programming language and the second programming language are similar.

25. The non-transitory computer-readable medium of claim 17, wherein the new code is at least one of a machine code and an executable code, wherein the machine code is a result of compilation.

26. The non-transitory computer-readable medium of claim 17, wherein the composition code contains a usage of at least one of a JoinInputs operator, an AggregateIndirectOutput operator, a RenameParameter operator, and a MakeOutputIndirect operator.

27. The non-transitory computer-readable medium of claim 26, wherein the composition code contains a usage of an additional operator, wherein the additional operator converts an input of a function from a direct form to an indirect form or vice versa.

28. The non-transitory computer-readable medium of claim 17, wherein the composition operator is built into a programming language, wherein the programming language is associated with the composition code, wherein the composition operator is defined as at least one of a method, a function, and a programming language construct, wherein the at least one of the method, the function, the programming language construct is associated with the programming language.

29. The non-transitory computer-readable medium of claim 17, wherein the composition operator is associated with at least one name, wherein the composition operator is called using the at least one name, wherein the at least one name comprises at least one symbol.

30. The non-transitory computer-readable medium of claim 17, wherein at least one developer marks at least one function parameter, wherein the at least one function parameter is called at most once or exactly once, wherein the method comprises choosing, using the processing device, at least one type of at least one of a new input and a new output associated with the at least one function parameter.

31. The non-transitory computer-readable medium of claim 30, wherein a compiler associated with the composition code is configured for determining a calling of the at least one function parameter without the mark by the at least one developer.

32. The non-transitory computer-readable medium of claim 19, wherein the method comprises matching, using the processing device, at least one input of the dependency parameter with at least one input of the second function based on an implicit conversion of at least one of the at least one input of the dependency parameter and the at least one input of the second function in a right direction.

33. The non-transitory computer-readable medium of claim 19, wherein the method comprises matching, using the processing device, at least one output of the dependency parameter with at least one output of the second function based on an implicit conversion of at least one of the at least one output of the dependency parameter and the at least one output of the second function in a right direction.

34. The non-transitory computer-readable medium of claim 17, wherein at least one parameter of the at least two functions comprises at least one name, wherein the at least one name is preserved during the generation of the resulting function.

35. The non-transitory computer-readable medium of claim 17, wherein at least one parameter of the first function comprises at least one name, wherein the at least one name is used to select the dependency parameter of the first function.

36. The non-transitory computer-readable medium of claim 17, wherein at least one parameter of the at least two functions comprises at least one name, wherein the at least one name is used to select at least one relevant parameter in at least one composition operator associated with the composition code.

37. The non-transitory computer-readable medium of claim 17, wherein at least one relevant parameter used in at least one composition operator is selected based on at least one of a parameter index and a parameter type.

38. The non-transitory computer-readable medium of claim 17, wherein the method comprises generating, using the processing device, at least one visual tool, wherein the at least one visual tool facilitates working with at least one composition operator associated with the composition code.

39. The non-transitory computer-readable medium of claim 17, wherein a validity of a usage of at least one operator associated with the composition code is determined at run time.

* * * * *